United States Patent
Minamino

(10) Patent No.: US 8,384,816 B2
(45) Date of Patent: Feb. 26, 2013

(54) ELECTRONIC APPARATUS, DISPLAY CONTROL METHOD, AND PROGRAM

(75) Inventor: Takanori Minamino, Kanagawa (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 12/696,721

(22) Filed: Jan. 29, 2010

(65) Prior Publication Data

US 2010/0245651 A1 Sep. 30, 2010

(30) Foreign Application Priority Data

Mar. 30, 2009 (JP) ................................. 2009-082274

(51) Int. Cl.
*H04N 5/222* (2006.01)
(52) U.S. Cl. ................................. 348/333.05
(58) Field of Classification Search .................. 348/239, 348/240.99, 333.05, 333.09, 333.11, 333.12, 348/220.1, 211.12, 240.1–240.3, 250.1
See application file for complete search history.

(56) References Cited

U.S. PATENT DOCUMENTS

| | | | | |
|---|---|---|---|---|
| 7,680,326 | B2 * | 3/2010 | Kameyama | 382/167 |
| 7,702,854 | B2 * | 4/2010 | Sato et al. | 711/118 |
| 2004/0106438 | A1 * | 6/2004 | Chen | 455/566 |
| 2006/0120692 | A1 * | 6/2006 | Fukuta | 386/95 |
| 2006/0146167 | A1 | 7/2006 | Aizawa et al. | |
| 2007/0030283 | A1 | 2/2007 | Shiraishi et al. | |
| 2007/0071416 | A1 * | 3/2007 | Ikemizu | 386/117 |
| 2008/0005087 | A1 * | 1/2008 | Sato et al. | 707/3 |
| 2008/0232695 | A1 * | 9/2008 | Noda et al. | 382/224 |

FOREIGN PATENT DOCUMENTS

| | | |
|---|---|---|
| EP | 1 870 812 A2 | 12/2007 |
| EP | 1 870 812 A3 | 12/2007 |
| JP | 2006-139846 | 6/2006 |

OTHER PUBLICATIONS

Thomas Bladh, "The Effect of Animated Transitions on User Navigation in 3D Tree-Maps", Towards an Understanding of Dynamics in Information Visualization, Licentiate Thesis, XP002590863, Jun. 2006, pp. 29-42 (with cover page).
Martin Tall, "NeoVisus—Gaze Interaction Interface Components", Master Thesis, Department of Cognitive Science, XP002590862, Spring 2008, pp. 1-22.
U.S. Appl. No. 13/333,260, filed Dec. 21, 2011, Minamino, et al.
U.S. Appl. No. 13/299,487, filed Nov. 18, 2011, Minamino, et al.

* cited by examiner

*Primary Examiner* — Chieh M Fan
*Assistant Examiner* — Ahmed A Berhan
(74) *Attorney, Agent, or Firm* — Oblon, Spivak, McClelland, Maier & Neustadt, L.L.P.

(57) ABSTRACT

An electronic apparatus includes an operation receiving unit configured to receive a selection operation for selecting, in a case where index images for allowing selection of content to be reproduced are displayed in list form on a display unit, an index image from among the index images displayed in list form, an image processing unit configured to sequentially scale up an image related to content corresponding to the selected index image from a size of the selected index image to a certain size, and a control unit configured to cause the display unit to display the image that is being sequentially scaled up, with an arrangement position of the selected index image serving as a reference position, and cause the display unit to display the content corresponding to the selected index image when a size of the image that is being sequentially scaled up reaches the certain size.

4 Claims, 32 Drawing Sheets

FIG. 9
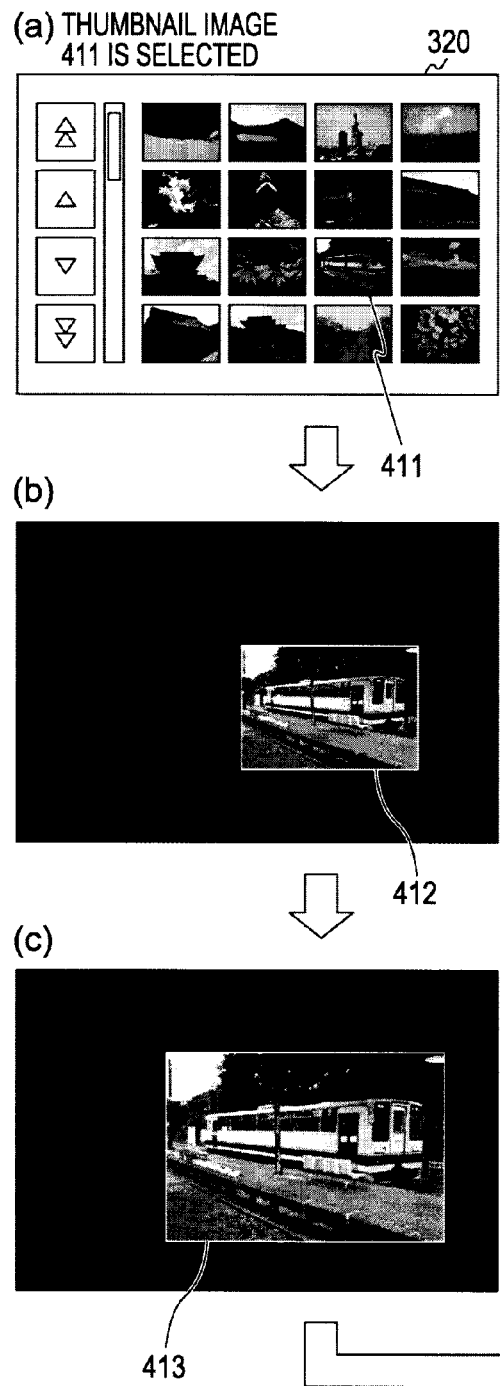
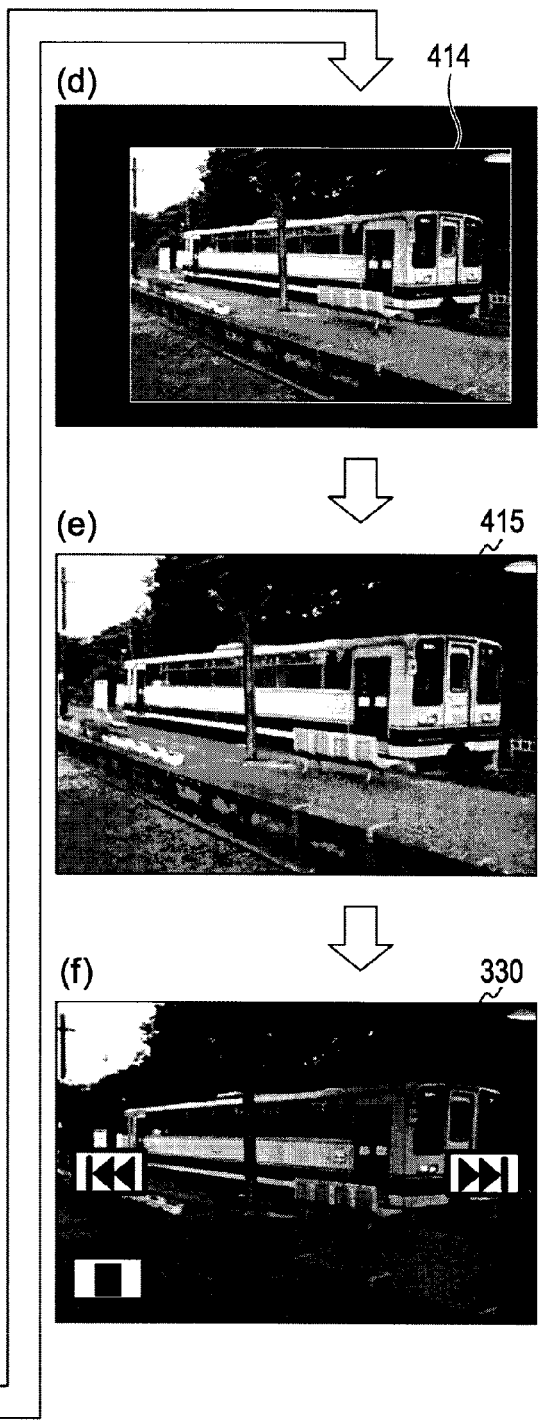

FIG. 11
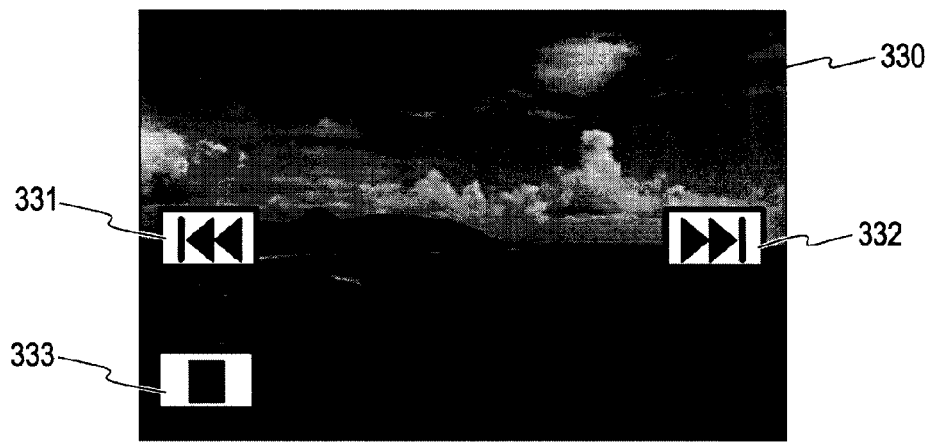
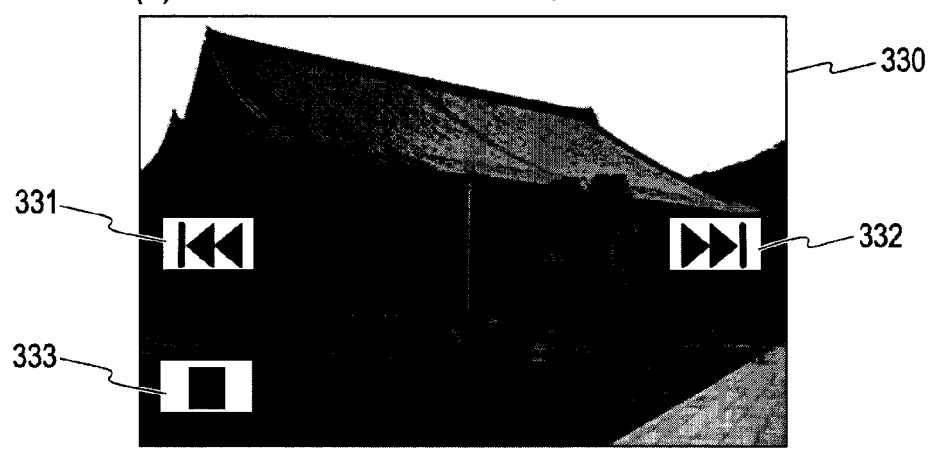

FIG. 26
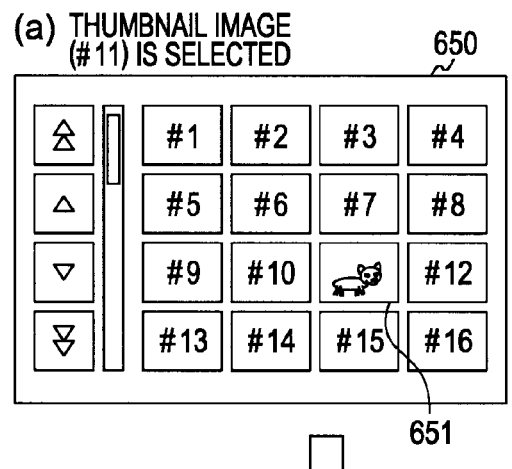
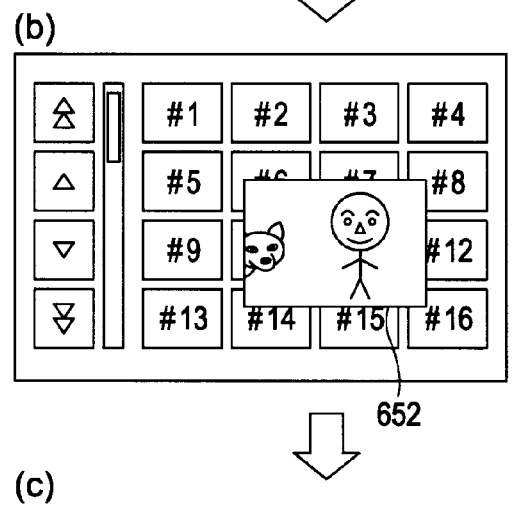
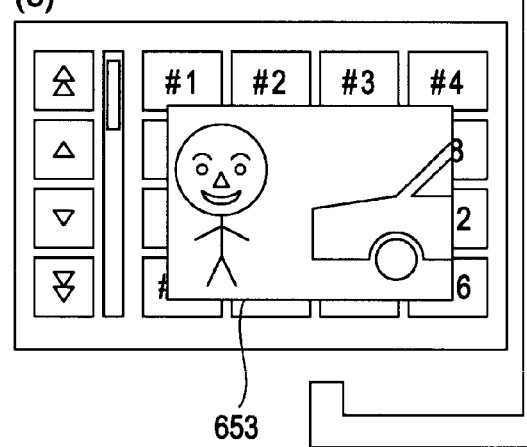
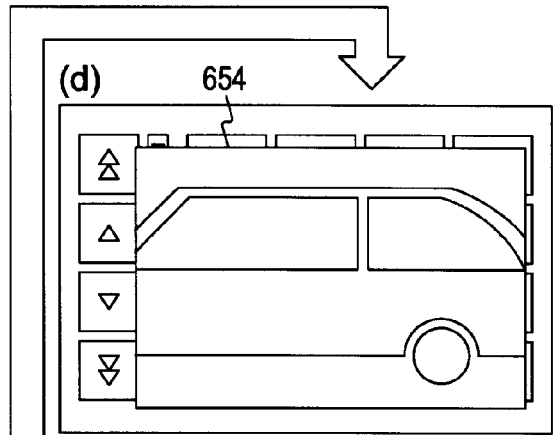
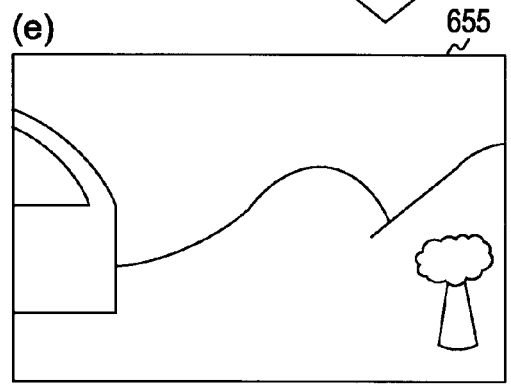
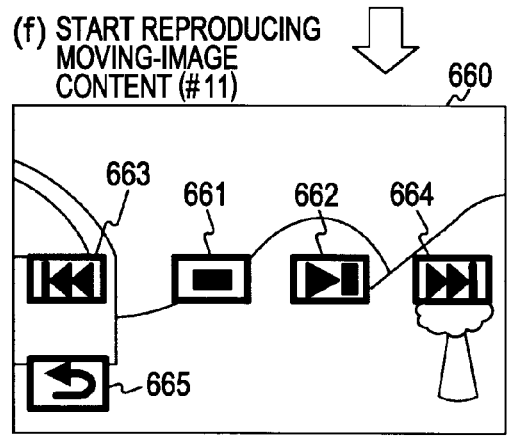

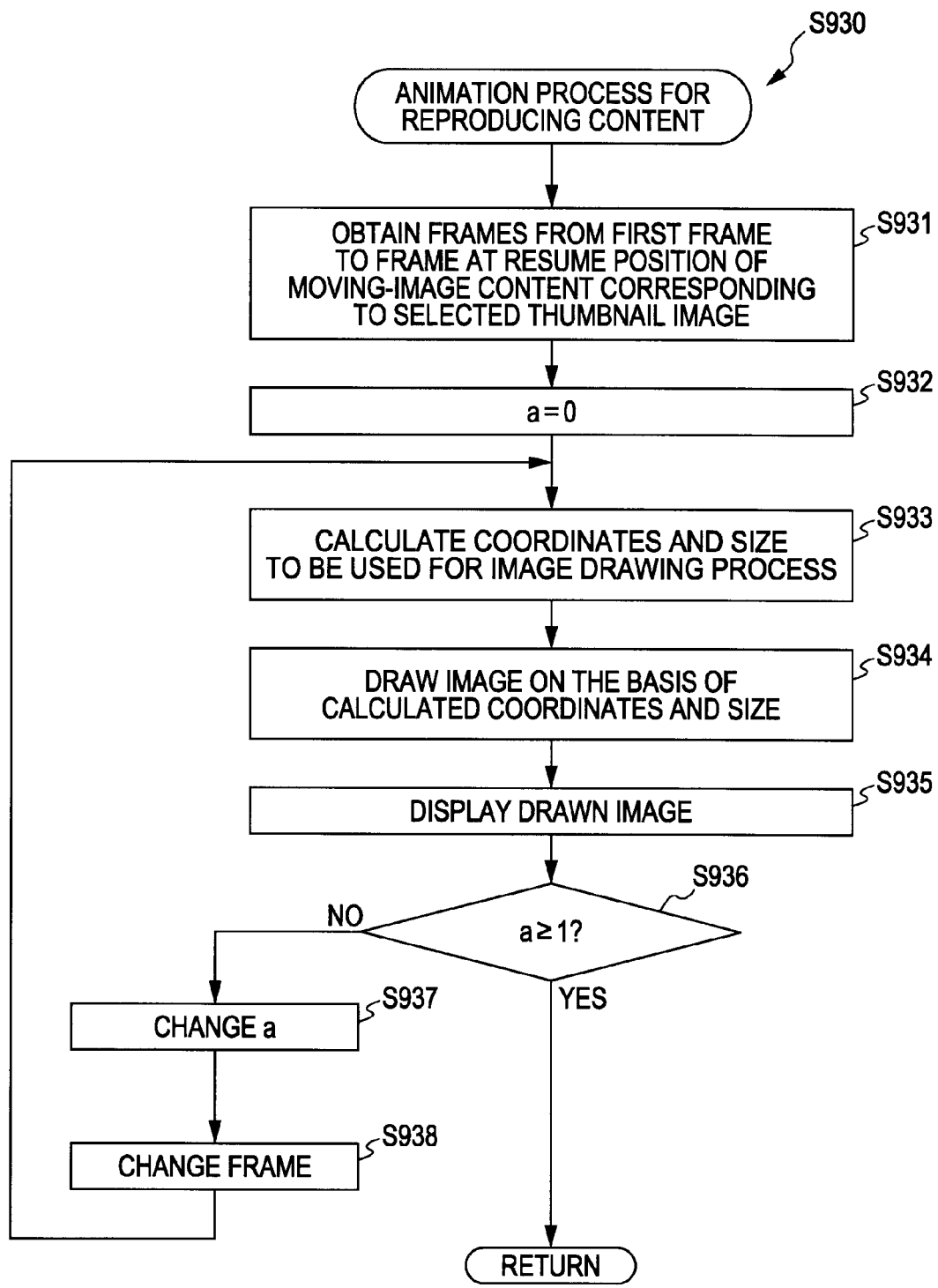

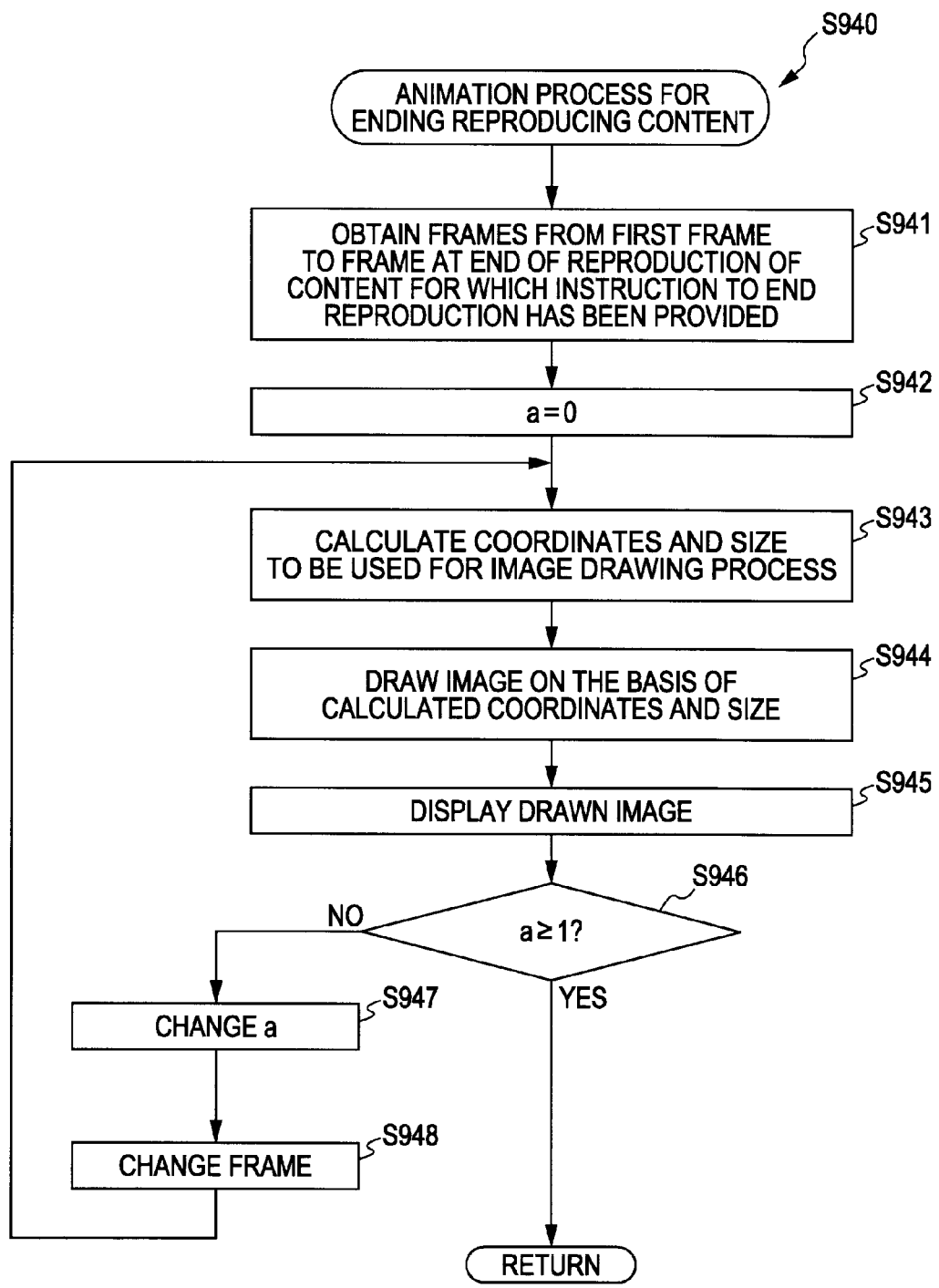

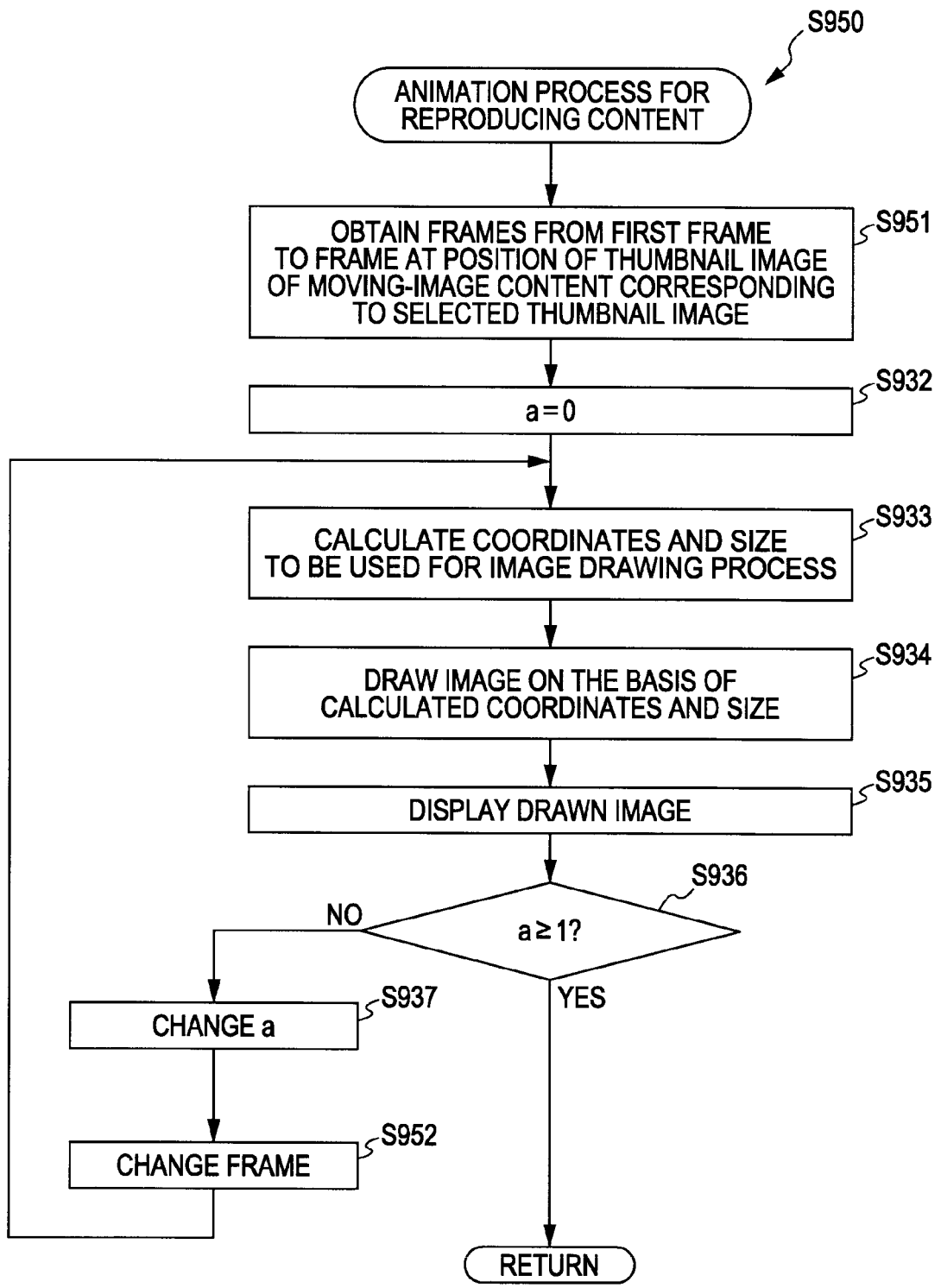

ELECTRONIC APPARATUS, DISPLAY CONTROL METHOD, AND PROGRAM

BACKGROUND OF THE INVENTION

1. Field of the Invention

The present invention relates to electronic apparatuses, and specifically relates to an electronic apparatus and a display control method for displaying in list form index images for allowing selection of content to be reproduced, and a program that causes a computer to execute the method.

2. Description of the Related Art

In recent years, imaging apparatuses, such as digital still cameras, for generating images by capturing subjects such as people and recording the images have become widespread. Also, there is suggested a reproducing apparatus capable of causing a user operation to select each of the recorded images and reproducing the selected image.

For example, there is suggested a reproducing apparatus that displays in list form thumbnail images corresponding to moving images in a matrix pattern and that reproduces a desired moving image by allowing a user to select a desired thumbnail image from among the thumbnail images displayed in list form (e.g., see Japanese Unexamined Patent Application Publication No. 2006-139846 (FIG. 1)).

SUMMARY OF THE INVENTION

According to the foregoing related art, a desired moving image can be reproduced with the moving image being displayed on an entire reproduction screen by selecting a desired thumbnail image from among thumbnail images displayed in list form. In such a case where a moving image is reproduced through selection of a desired thumbnail image, a display status of a display unit is switched from a list screen for displaying in list form thumbnail images to a reproduction screen for reproducing a moving image. In such a case where a display screen is switched, an arrangement position of a thumbnail image on the list screen is different from a reproduction position of a moving image on the reproduction screen, and thus the correspondence between the thumbnail image selected by a user and the moving image reproduced through this selection may be unclear. Therefore, it is assumed that it is difficult to determine whether the moving image intended by the user has been correctly selected.

Also, assume a case of switching the display status of the display unit from the reproduction screen to the list screen in order to reproduce a moving image other than a moving image that has been reproduced on the reproduction screen. In such a case of switching the display screen, too, the correspondence between the moving image reproduced on the reproduction screen and the thumbnail image displayed on the list screen may be unclear. Thus, for example, it is assumed that it is difficult to identify the thumbnail image corresponding to the moving image that was being reproduced immediately previously.

Accordingly, it is desirable to easily recognize the correspondence between index images displayed in list form and content to be reproduced.

According to a first embodiment of the present invention, there are provided an electronic apparatus, a display control method therefor, and a program that causes a computer to execute the method. The electronic apparatus includes an operation receiving unit configured to receive a selection operation for selecting, in a case where index images for allowing selection of content to be reproduced are displayed in list form on a display unit, an index image from among the index images displayed in list form, an image processing unit configured to sequentially scale up an image related to content corresponding to the selected index image from a size of the selected index image to a certain size, and a control unit configured to cause the display unit to display the image that is being sequentially scaled up, with an arrangement position of the selected index image serving as a reference position, and cause the display unit to display the content corresponding to the selected index image when a size of the image that is being sequentially scaled up reaches the certain size. Accordingly, when a selection operation for selecting an index image from among index images displayed in list form is received, an image related to content corresponding to the selected index image is sequentially scaled up from a size of the selected index image to a certain size, the image that is being sequentially scaled up is displayed with an arrangement position of the selected index image serving as a reference position, and the content corresponding to the selected index image is displayed when a size of the image that is being sequentially scaled up reaches the certain size.

In the first embodiment, the content may be moving-image content, the electronic apparatus may further include a content management information storage unit configured to store content management information including resume information about a frame obtained at the end of an immediately-preceding reproduction of the moving-image content, and the image processing unit may sequentially scale up, along a time axis, images corresponding to individual frames from a first frame to a frame specified by the resume information among individual frames constituting moving-image content corresponding to the selected index image. Accordingly, among individual frames constituting moving-image content corresponding to a selected index image, images corresponding to individual frames from a first frame to a frame specified by resume information are sequentially scaled up along a time axis.

In the first embodiment, the content may be moving-image content, the index image may be an image corresponding to a representative frame among individual frames constituting the moving-image content, and the image processing unit may sequentially scale up images corresponding to individual frames from the representative frame to a first frame among individual frames constituting moving-image content corresponding to the selected index image from the representative frame toward the first frame. Accordingly, among individual frames constituting moving-image content corresponding to a selected index image, images corresponding to individual frames from a representative frame to a first frame are sequentially scaled up from the representative frame toward the first frame.

In the first embodiment, the image processing unit may sequentially scale up the image related to the content corresponding to the selected index image and perform a fade-out process on the image in accordance with the scaling up. Accordingly, an image related to content corresponding to a selected index image is sequentially scaled up and a fade-out process is performed on an image in accordance with the scaling up.

In the first embodiment, the image processing unit may sequentially scale up the image related to the content corresponding to the selected index image while decreasing a scale-up rate per unit time of the image. Accordingly, an image related to content corresponding to a selected index image is sequentially scaled up while decreasing a scale-up rate per unit time of the image.

In the first embodiment, the certain size may be a size of a reproduction screen configured to display the content corresponding to the selected index image, and the control unit may cause the display unit to display the image that is being sequentially scaled up so that the image is sequentially enlarged from the reference position so as to fill a content display area of the reproduction screen. Accordingly, an image that is being sequentially scaled up is displayed so that the image is sequentially enlarged from a reference position so as to fill a content display area of a reproduction screen.

According to a second embodiment of the present invention, there are provided an electronic apparatus, a display control method therefor, and a program that causes a computer to execute the method. The electronic apparatus includes an operation receiving unit configured to receive a selection operation for selecting, in a case where index images for allowing selection of content to be reproduced are displayed in list form on a display unit, an index image from among the index images displayed in list form, an image processing unit configured to sequentially scale up an image related to content corresponding to the selected index image from a size of the selected index image to a certain size, and a control unit configured to cause the display unit to display the image that is being sequentially scaled up to the certain size, with an arrangement position of the selected index image serving as a reference position. Accordingly, when a selection operation for selecting an index image from among index images displayed in list form is received, an image related to content corresponding to the selected index image is sequentially scaled up from a size of the selected index image to a certain size, and the image that is being sequentially scaled up to the certain size is displayed, with an arrangement position of the selected index image serving as a reference position.

According to a third embodiment of the present invention, there are provided an electronic apparatus, a display control method therefor, and a program that causes a computer to execute the method. The electronic apparatus includes an operation receiving unit configured to receive a switching operation for a display unit from a reproduction screen configured to display content to an index-image-list display screen configured to display in list form index images for allowing selection of the content, an image processing unit configured to sequentially scale down, from a size of the content on the reproduction screen to a certain size, an image related to content that is displayed on the reproduction screen when the switching operation is received, and a control unit configured to cause the display unit to display the image that is being sequentially scaled down, with an arrangement position of an index image corresponding to the content that is displayed on the reproduction screen when the switching operation is received serving as a reference position, and cause the display unit to display the index image at the arrangement position of the display unit when a size of the image that is being sequentially scaled down reaches the certain size. Accordingly, when a switching operation for a display unit from a reproduction screen to an index-image-list display screen is received, an image related to content that is displayed on the reproduction screen when the switching operation is received is sequentially scaled down from a size of the content on the reproduction screen to a certain size, the image that is being sequentially scaled down is displayed, with an arrangement position of an index image corresponding to the content that is displayed on the reproduction screen when the switching operation is received serving as a reference position, and the index image is displayed at the arrangement position when a size of the image that is being sequentially scaled down reaches the certain size.

In the third embodiment, the content may be moving-image content, the index image may be an image corresponding to a representative frame among individual frames constituting the moving-image content, and the image processing unit may sequentially scale down individual frames from the representative frame to a current frame that is displayed on the reproduction screen when the switching operation is received among individual frames constituting moving-image content that is displayed on the reproduction screen when the switching operation is received from the current frame toward the representative frame. Accordingly, among individual frames constituting moving-image content that is displayed on a reproduction screen when a switching operation is received, individual frames from a representative frame to a current frame are sequentially scaled down from the current frame toward the representative frame.

In the third embodiment, the image processing unit may sequentially scale down the image related to the content that is displayed on the reproduction screen when the switching operation is received while decreasing a scale-down rate per unit time of the image. Accordingly, an image related to content that is displayed on a reproduction screen when a switching operation is received is sequentially scaled down while decreasing a scale-down rate per unit time of the image.

According to a fourth embodiment of the present invention, there are provided an electronic apparatus, a display control method therefor, and a program that causes a computer to execute the method. The electronic apparatus includes an operation receiving unit configured to receive a switching operation for a display unit from a reproduction screen configured to display content to an index-image-list display screen configured to display in list form index images for allowing selection of the content, an image processing unit configured to sequentially scale down, from a size of the content on the reproduction screen to a certain size, an image related to content that is displayed on the reproduction screen when the switching operation is received, and a control unit configured to cause the display unit to display the image that is being sequentially scaled down to the certain size, with an arrangement position of an index image corresponding to the content that is displayed on the reproduction screen when the switching operation is received serving as a reference position. Accordingly, when a switching operation for a display unit from a reproduction screen to an index-image-list display screen is received, an image related to content that is displayed on the reproduction screen when the switching operation is received is sequentially scaled down from a size of the content on the reproduction screen to a certain size, and the image that is being sequentially scaled down to the certain size is displayed, with an arrangement position of an index image corresponding to the content that is displayed on the reproduction screen when the switching operation is received serving as a reference position.

According to the embodiments of the present invention, an excellent effect of easily recognizing the correspondence between index images displayed in list form and content to be reproduced can be obtained.

BRIEF DESCRIPTION OF THE DRAWINGS

FIG. 9 is a diagram illustrating transition of a display screen displayed on the display unit according to the first embodiment of the present invention;

FIG. 11 is a diagram illustrating transition of a content reproduction screen displayed on the display unit according to the first embodiment of the present invention;

FIG. 26 is a diagram illustrating transition of a display screen displayed on the display unit according to the second embodiment of the present invention;

FIG. 30 is a flowchart illustrating an animation process for reproducing content in a process procedure of a display control process performed by the imaging apparatus according to the second embodiment of the present invention;

FIG. 31 is a flowchart illustrating an animation process for ending reproducing content in the process procedure of the display control process performed by the imaging apparatus according to the second embodiment of the present invention; and FIG. 32 is a flowchart illustrating an animation process for reproducing content in the process procedure of the display control process performed by the imaging apparatus according to the second embodiment of the present invention.

DESCRIPTION OF THE PREFERRED EMBODIMENTS

Hereinafter, embodiments for carrying out the present invention (hereinafter referred to as embodiments) will be described. The description will be given in the following order.

1. First embodiment (display control: an example of performing animation display while scaling up or down an image related to content at switching between a content selection screen and a content reproduction screen)

2. Second embodiment (display control: an example of performing animation display while scaling up or down a plurality of frames constituting moving-image content)

1. First Embodiment

Configuration Example of Imaging Apparatus

Figure 1:
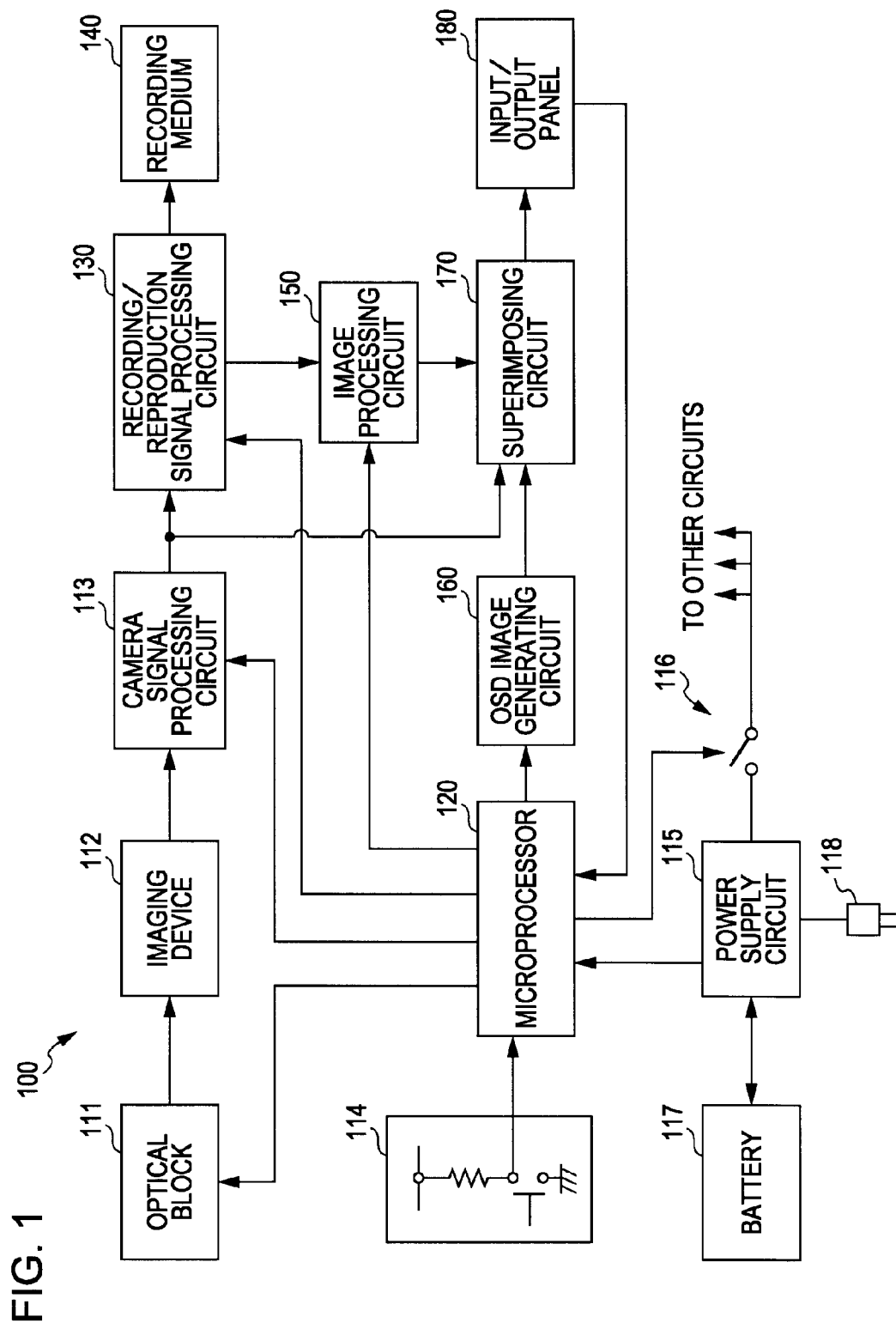
FIG. 1 is a block diagram illustrating an internal configuration example of an imaging apparatus according to a first embodiment of the present invention.

FIG. 1 is a block diagram illustrating an internal configuration example of an imaging apparatus 100 according to a first embodiment of the present invention. The imaging apparatus 100 includes an optical block 111, an imaging device 112, a camera signal processing circuit 113, a key input circuit 114, a power supply circuit 115, a power supply control circuit 116, a battery 117, and an alternating current (AC) cable 118. Also, the imaging apparatus 100 includes a microprocessor 120, a recording/reproduction signal processing circuit 130, a recording medium 140, an image processing circuit 150, an on-screen display (OSD) image generating circuit 160, a superimposing circuit 170, and an input/output panel 180. For example, the imaging apparatus 100 can be realized by a digital video camera capable of capturing an image of a subject to generate image data and performing various image processes on the image data.

The optical block 111 collects external light and outputs the collected light to the imaging device 112. In the optical block 111, focus control, adjustment of an aperture value, and the like are performed on the basis of a control signal output from the microprocessor 120.

The imaging device 112 is an imaging device for converting an optical signal input via the optical block 111 into an electric signal, and outputs the electric signal generated through the conversion to the camera signal processing circuit 113. As the imaging device 112, a charge coupled device (CCD) or a complementary metal-oxide semiconductor (CMOS) may be used, for example.

The camera signal processing circuit 113 performs an appropriate signal process on an electric signal output from the imaging device 112 on the basis of a control signal output from the microprocessor 120. Then, the camera signal processing circuit 113 outputs, to the recording/reproduction signal processing circuit 130 and the superimposing circuit 170, the electric signal on which the signal process has been performed, the electric signal serving as a video signal.

The key input circuit 114 is a circuit that includes one or a plurality of external operation members and that outputs an electric signal corresponding to an operation performed on the external operation member to the microprocessor 120. The external operation member is a hardware key provided on the imaging apparatus 100, for example.

The power supply circuit 115 is a power supply circuit for supplying power to the microprocessor 120 and other circuits. The source of the power is the battery 117 or the AC cable 118.

The power supply control circuit 116 operates power supply to other circuits on the basis of a control signal output from the microprocessor 120.

The battery 117 is a battery for supplying electricity to the power supply circuit 115. The battery 117 is charged by the power supply circuit 115 with electricity supplied through the AC cable 118. The AC cable 118 is an AC cable for supplying electricity to the power supply circuit 115.

The microprocessor 120 is a microprocessor for controlling the individual units of the imaging apparatus 100 on the basis of a control program stored in a memory (not illustrated). Also, the microprocessor 120 determines a press state of the input/output panel 180 or the key input circuit 114 on the basis of an electric signal output from the input/output panel 180 or the key input circuit 114. Then, on the basis of a determination result, the microprocessor 120 outputs a command to the recording/reproduction signal processing circuit 130, the image processing circuit 150, the OSD image generating circuit 160, or the like.

The recording/reproduction signal processing circuit 130 performs recording or reading on/from the recording medium 140 on the basis of a control signal output from the microprocessor 120. Specifically, during recording of a moving image, the recording/reproduction signal processing circuit 130 encodes a video signal output from the camera signal processing circuit 113 and records it as a moving-image file (moving-image content) on the recording medium 140. Also, when an instruction to record a still image is provided (a so-called shutter operation is performed), the recording/reproduction signal processing circuit 130 encodes a video signal output from the camera signal processing circuit 113 and records it as a still-image file (still-image content) on the recording medium 140. Also, content management information for managing the moving-image content or still-image content is recorded on the recording medium 140 while being associated with the content. When a content reproduction mode is set, the recording/reproduction signal processing circuit 130 reads and decodes the moving-image file or still-image file stored in the recording medium 140 and outputs the file to the image processing circuit 150. When an instruction operation for displaying a content selection screen is performed, the recording/reproduction signal processing circuit 130 reads content management information stored in the recording medium 140 and outputs the information to the image processing circuit 150.

The image processing circuit 150 performs various image processes, such as scale-up and scale-down processes of an image corresponding to content output from the recording/reproduction signal processing circuit 130, on the basis of a control signal output from the microprocessor 120. Then, the image processing circuit 150 outputs a video signal on which those image processes have been performed to the superimposing circuit 170.

The OSD image generating circuit 160 includes a video random access memory (VRAM) for holding various images to be displayed on the input/output panel 180 and generates various images to be displayed on the input/output panel 180. The OSD image generating circuit 160 outputs a display signal corresponding to a generated image to the superimposing circuit 170. For example, the OSD image generating circuit 160 generates individual operation members to be displayed on a content selection screen (e.g., operation buttons 301 to 304 and a scroll bar 305 illustrated in part (a) of FIG. 4). Also, for example, the OSD image generating circuit 160 generates individual operation buttons to be displayed on a content reproduction screen (e.g., operation buttons 331 to 333 illustrated in part (b) of FIG. 4).

The superimposing circuit 170 is a superimposing circuit for superimposing individual signals output from the camera signal processing circuit 113, the OSD image generating circuit 160, or the image processing circuit 150 to generate an image signal, and outputs the superimposed image signal to the input/output panel 180. For example, when a monitoring mode is set, the superimposing circuit 170 superimposes a video signal output from the camera signal processing circuit 113 and a display signal output from the OSD image generating circuit 160 to generate an image signal for displaying a captured image. Also, for example, when a content reproduction mode is set, the superimposing circuit 170 superimposes a display signal output from the OSD image generating circuit 160 and a video signal output from the image processing circuit 150 to generate an image signal for displaying a content selection screen or a content reproduction screen.

The input/output panel 180 displays individual images on its display surface and receives an operation-input from a user, and outputs information about the received operation to the microprocessor 120. Specifically, the input/output panel 180 displays an image corresponding to an image signal output from the superimposing circuit 170 on a display panel (e.g., a liquid crystal display (LCD) panel). Also, when detecting an object that is close to or in contact with the display panel, the input/output panel 180 converts this detection state into an electric signal and outputs the electric signal generated through the conversion to the microprocessor 120. The input/output panel 180 is realized by a touch panel, for example.

Figure 2:
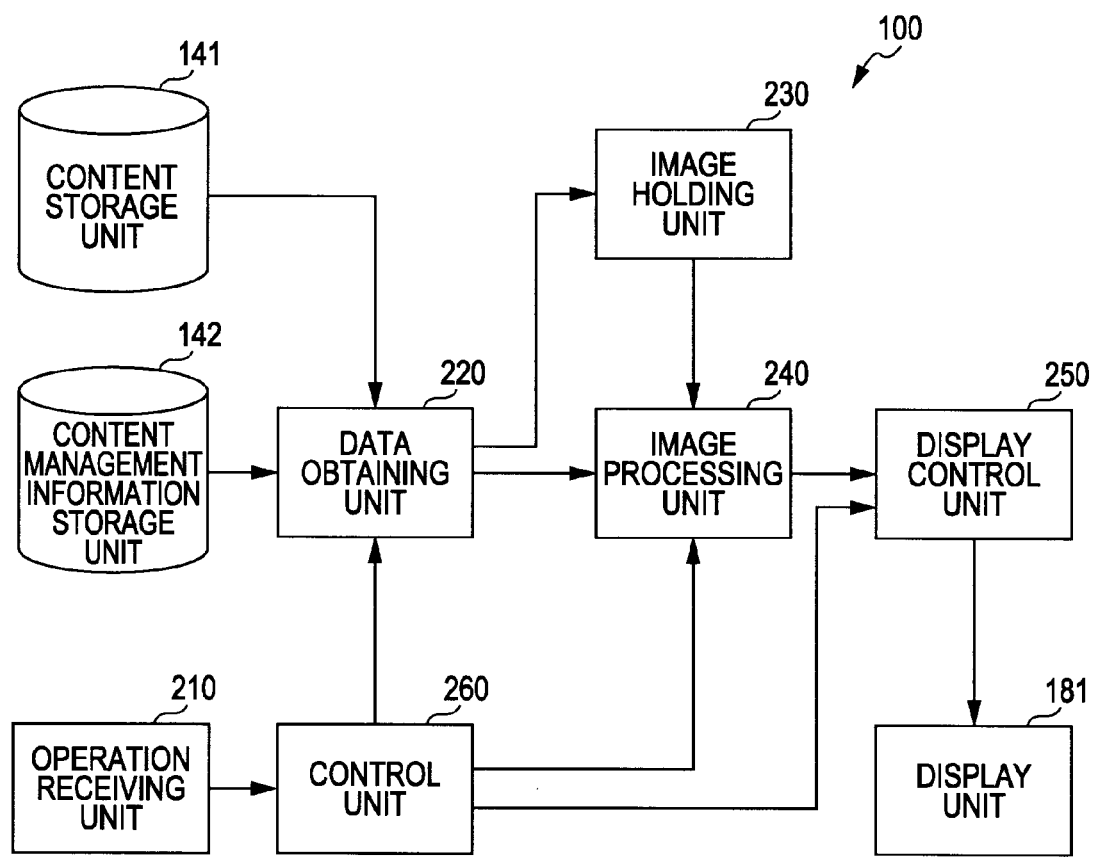
FIG. 2 is a block diagram illustrating a functional configuration example of the imaging apparatus according to the first embodiment of the present invention.

FIG. 2 is a block diagram illustrating a functional configuration example of the imaging apparatus 100 according to the first embodiment of the present invention. The imaging apparatus 100 includes a content storage unit 141, a content management information storage unit 142, a display unit 181, an operation receiving unit 210, a data obtaining unit 220, an image holding unit 230, an image processing unit 240, a display control unit 250, and a control unit 260.

The content storage unit 141 stores still-image content or moving-image content, and supplies the still-image content or moving-image content stored therein to the data obtaining unit 220. The content storage unit 141 corresponds to the recording medium 140 illustrated in FIG. 1.

The content management information storage unit 142 stores content management information for managing pieces of content stored in the content storage unit 141 by associating the information with each piece of content. Also, content management information storage unit 142 supplies the content management information stored therein to the data obtaining unit 220. The content management information includes a thumbnail image representing still-image content or moving-image content. In a case where content corresponding to this index image is moving-image content, the thumbnail image of a representative frame of the moving-image content (e.g., the first frame) is recorded. In a case where corresponding content is still-image content, the thumbnail image of the still-image content is recorded, for example. The content management information storage unit 142 corresponds to the recording medium 140 illustrated in FIG. 1.

The display unit 181 is a display unit for displaying various images on the basis of control by the display control unit 250. The display unit 181 corresponds to the input/output panel 180 illustrated in FIG. 1.

The operation receiving unit 210 is an operation receiving unit for receiving an operation-input from a user and outputs information about the operation corresponding to the received operation-input to the control unit 260. The operation receiving unit 210 corresponds to the key input circuit 114 or the input/output panel 180 illustrated in FIG. 1.

The data obtaining unit 220 obtains data stored in the content storage unit 141 or the content management information storage unit 142 and supplies the obtained data to individual units on the basis of control by the control unit 260. Also, the data obtaining unit 220 causes the image holding unit 230 to hold part of obtained data (e.g., an image to be scaled up or down by the image processing unit 240). The data obtaining unit 220 corresponds to the recording/reproduction signal processing circuit 130 illustrated in FIG. 1.

The image holding unit 230 holds images output from the data obtaining unit 220 and supplies the images held therein to the image processing unit 240. The image holding unit 230 corresponds to the recording/reproduction signal processing circuit 130 illustrated in FIG. 1.

The image processing unit 240 performs an image process on an image output from the data obtaining unit 220 or an image held in the image holding unit 230 on the basis of control by the control unit 260, and outputs the image on which the image process has been performed to the display control unit 250. For example, the image processing unit 240 draws thumbnail images to be displayed on a content selection screen (e.g., the content selection screen 320 illustrated in part (a) of FIG. 4) on the basis of content management information output from the data obtaining unit 220. Also, the image processing unit 240 draws content output from the data obtaining unit 220 on a content reproduction screen (e.g., the content reproduction screen 330 illustrated in part (b) of FIG. 4). Also, the image processing unit 240 draws an image output from the data obtaining unit 220 or an image held in the image holding unit 230 by scaling up or down the image. Those image processes will be described in detail with reference to FIGS. 3A to 7.

The display control unit 250 causes the display unit 181 to display an image output from the image processing unit 240 on the basis of control by the control unit 260. Display examples will be described in detail with reference to FIG. 4 and FIGS. 8 to 14. The display control unit 250 corresponds to the OSD image generating circuit 160 and the superimposing circuit 170 illustrated in FIG. 1.

The control unit 260 controls the entire imaging apparatus 100. For example, the control unit 260 performs control in accordance with an operation-input from a user received by the operation receiving unit 210. In a case where an instruction operation for displaying a content selection screen is received by the operation receiving unit 210, the control unit 260 causes the display unit 181 to display the content selection screen. Also, for example, in a case where a selection operation for selecting an index image is received on the content selection screen, the control unit 260 causes the selected index image to be scaled up, and causes the display unit 181 to perform animation display of the index image that is being scaled up. When the size of the index image that is being scaled up reaches the size of a content display area of a content reproduction screen, the control unit 260 causes the display unit 181 to display the content corresponding to the selected index image. Also, for example, when a switching operation of the display unit 181 from the content reproduction screen to the content selection screen is received, the control unit 260 causes the image displayed on the content reproduction screen to be scaled down. Then, the control unit 260 causes the display unit 181 to perform animation display of the image that is being scaled down. When the size of the image that is being scaled down reaches the size of the index image on the content selection screen, the control unit 260 causes the display unit 181 to display the corresponding index image. The foregoing switching operation includes, for example, an instruction operation for providing an instruction to stop reproduction while still-image content is being reproduced, or an instruction operation for providing an instruction to return to the content selection screen while moving-image content is being reproduced. The control unit 260 corresponds to the microprocessor 120 illustrated in FIG. 1.

Display Example of Content Selection Screen and Content Reproduction Screen

Figure 3A:
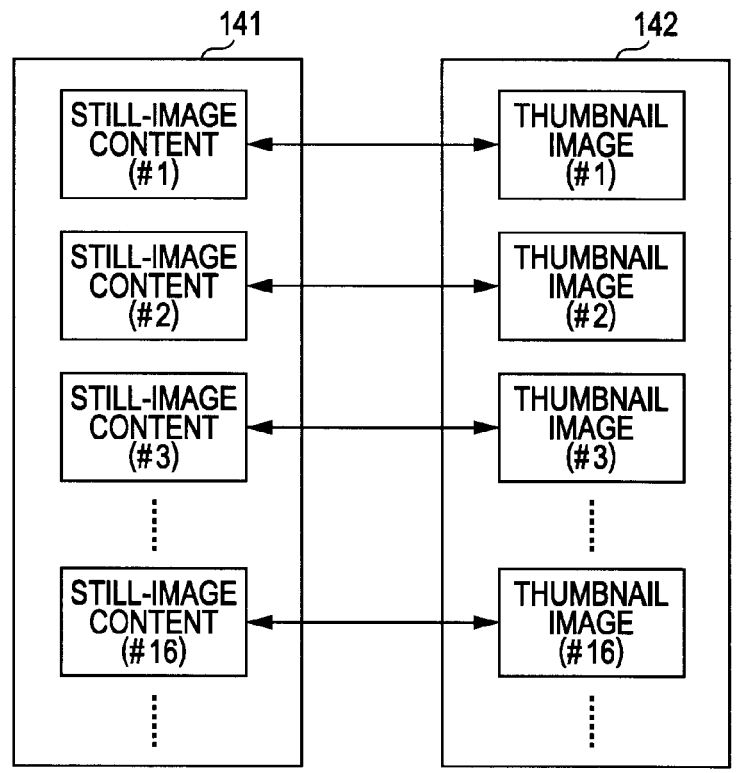
FIGS. 3A and 3B are diagrams schematically illustrating the relationship between images stored in a content management information storage unit and a content selection screen displayed on a display unit according to the first embodiment of the present invention.
Figure 3B:
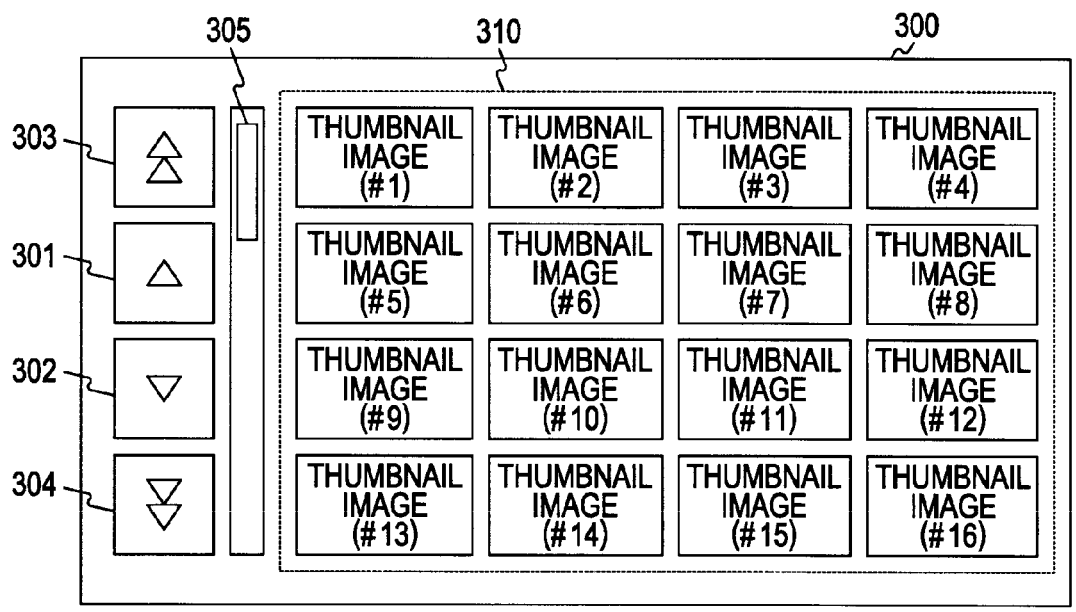

FIGS. 3A and 3B are diagrams schematically illustrating the relationship between images stored in the content management information storage unit 142 and the content selection screen displayed on the display unit 181 according to the first embodiment of the present invention. In the example illustrated in FIGS. 3A and 3B, still-image content is used as the content stored in the content storage unit 141.

FIG. 3A schematically illustrates the relationship between the content (pieces of still-image content (#1 to #16)) stored in the content storage unit 141 and the thumbnail images (#1 to #16) stored in the content management information storage unit 142. The thumbnail images (#1 to #16) are thumbnail images generated for the corresponding pieces of content and are included in the content management information of the corresponding pieces of content. In FIG. 3A, the correspondence between the pieces of content stored in the content storage unit 141 and the thumbnail images stored in the content management information storage unit 142 is indicated by arrows, and the pieces of content and the thumbnail images corresponding to each other are denoted by the same numbers (#1 to #16).

FIG. 3B illustrates the content selection screen (index-image-list display screen) 300 used for selecting content to be reproduced. The content selection screen 300 is provided with operation buttons 301 to 304, a scroll bar 305, and a thumbnail image display area 310.

The operation buttons 301 to 304 and the scroll bar 305 are used to perform a scroll operation for displaying other thumbnail images by moving the thumbnail images displayed in the thumbnail image display area 310 upward or downward.

The thumbnail image display area 310 is an area for displaying thumbnail images stored in the content management information storage unit 142, and the thumbnail images (#1 to #16) are displayed in list form in a matrix pattern of 4×4, for example. In the example illustrated in FIG. 3B, the same characters as those in the individual thumbnail images illustrated in FIG. 3A are shown in the rectangles indicating the individual thumbnail images for easy explanation. A display example of the thumbnail images displayed on the content selection screen 300 is illustrated in part (a) of FIG. 4.

Figure 4:
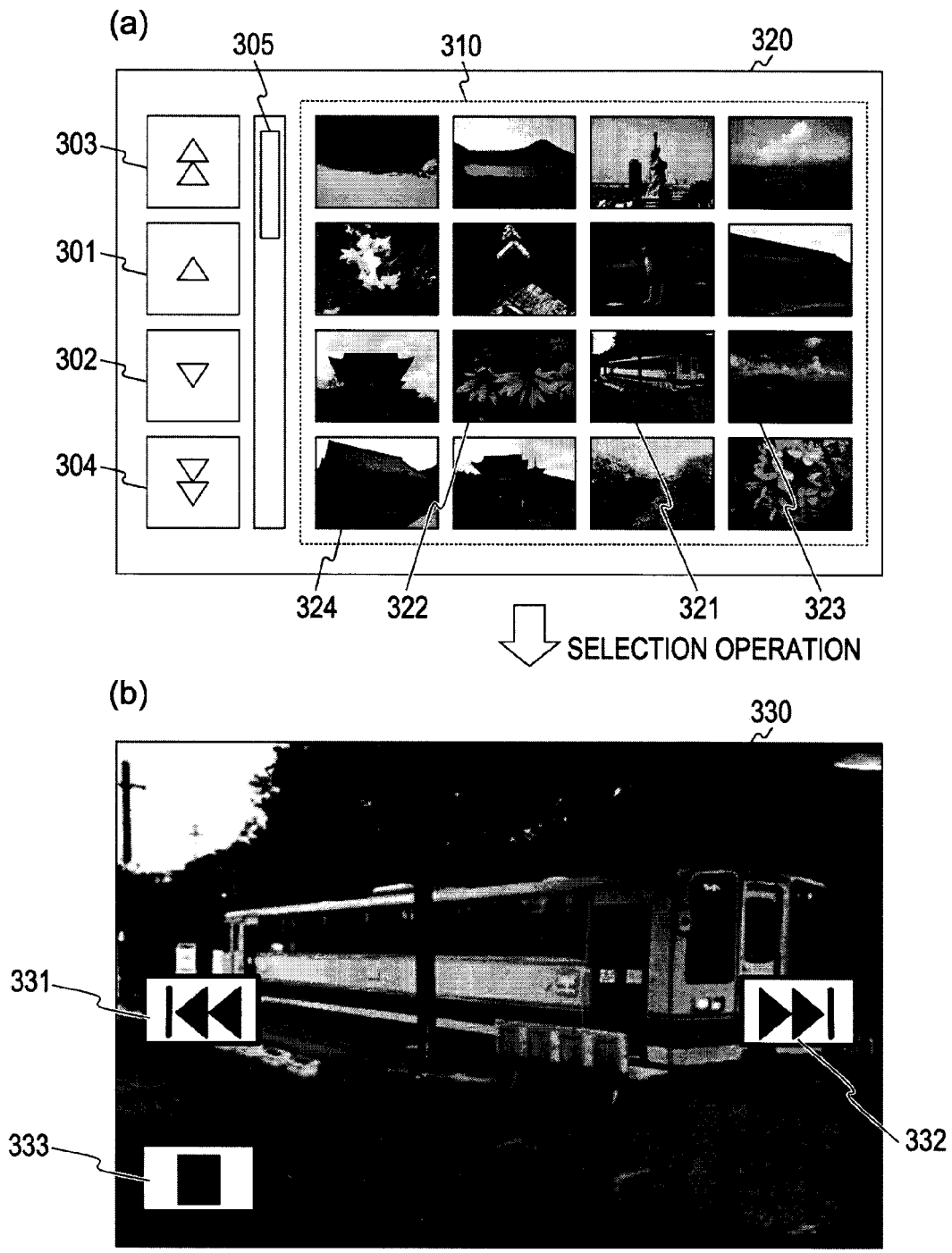
FIG. 4 is a diagram illustrating an example of a content selection screen and a content reproduction screen displayed on the display unit according to the first embodiment of the present invention.

FIG. 4 is a diagram illustrating an example of the content selection screen and the content reproduction screen displayed on the display unit 181 according to the first embodiment of the present invention. In the content selection screen 320 illustrated in part (a) of FIG. 4, thumbnail images of actually-recorded still-image content are arranged in the positions of the thumbnail images (#1 to #16) in the thumbnail image display area 310 illustrated in FIG. 3B. That is, the example illustrated in part (a) of FIG. 4 is the same as the example illustrated in FIG. 3B except that thumbnail images of actually-recorded still-image content are arranged. Thus, the parts common to those in the example illustrated in FIG. 3B are denoted by the same reference numerals and the description thereof is omitted. In the example illustrated in FIG. 4, still-image content is used as the content stored in the content storage unit 141.

As illustrated in part (a) of FIG. 4, on the content selection screen 320, thumbnail images for allowing selection of content stored in the content storage unit 141 are displayed in list form in the thumbnail image display area 310. By selecting a thumbnail image displayed in list form in the thumbnail image display area 310, the content corresponding to the selected thumbnail image can be reproduced. Here, a selection operation for selecting a thumbnail image may be performed using a touch operation in the input/output panel 180 or may be performed using an operation-input from the key input circuit 114. For example, in a case where a selection operation is performed on the input/output panel 180, the selection operation is performed with a finger touch on a display area of a desired thumbnail image among the thumbnail images displayed in list form in the thumbnail image display area 310. Also, for example, in a case where a selection operation is performed using an operation-input from the key input circuit 114, a selection operation using a cross key or a set key is performed.

Part (b) of FIG. 4 illustrates the content reproduction screen 330 for reproducing the content corresponding to the thumbnail image selected on the content selection screen 320 illustrated in part (a) of FIG. 4. For example, when a thumbnail image 321 is selected on the content selection screen 320 illustrated in part (a) of FIG. 4, the content reproduction screen 330 for reproducing the content corresponding to the thumbnail image 321 is displayed. The content reproduction screen 330 is a screen for displaying the still-image content corresponding to the selected thumbnail image 321 (a captured image in which a train is a main subject) on the entire display surface of the display unit 181. In addition, the still-image content to be reproduced is displayed on the content reproduction screen 330, and operation buttons 331 to 333 are provided on the still-image content. The operation button 331 is a button that is pressed to display the preceding content of the still-image content that is being displayed (e.g., the still-image content corresponding to a thumbnail image 322 illustrated in part (a) of FIG. 4). The operation button 332 is a button that is pressed to display the next content of the still-image content that is being displayed (e.g., the still-image content corresponding to a thumbnail image 323 illustrated in part (a) of FIG. 4). The operation button 333 is a button that is pressed to stop reproduction of content and return to the content selection screen. That is, when the operation button 333 is pressed on the content reproduction screen 330 illustrated in part (b) of FIG. 4, the content selection screen 320 illustrated in part (a) of FIG. 4 is displayed.

Here, for example, assume a case where the content reproduction screen 330 is displayed immediately after the thumbnail image 321 is selected on the content selection screen 320. In this case, the content corresponding to the thumbnail image 321 is displayed on the content reproduction screen 330 regardless of an arrangement position of the selected thumbnail image 321. Thus, it is assumed that it is difficult to intuitively recognize the correspondence between the thumbnail image 321 and the content corresponding thereto. Also, for example, assume a case where the content selection screen 320 is displayed immediately after the operation button 333 is pressed on the content reproduction screen 330. In this case, the content selection screen 320 is displayed regardless of the arrangement position of the thumbnail image 321 corresponding to the content that was displayed on the content reproduction screen 330. Thus, it is assumed that it is difficult to intuitively recognize the correspondence between the thumbnail image 321 and the content corresponding thereto. Accordingly, in the first embodiment of the present invention, an image related to content to be reproduced is displayed by animation while being scaled up or down at the switching between the content selection screen and the content reproduction screen.

Example of Scaling Up or Down an Image Related to Content to Be Reproduced

FIGS. 5A to 6B are diagrams illustrating the relationship between an image to be scaled up or down by the image processing unit 240 and the display screen in the display unit 181 according to the first embodiment of the present invention. In the example illustrated in FIGS. 5A to 6B, a description will be given about a case of scaling up or down an image in an xy coordinate system in which the upper-left corner of a rectangle of the content selection screen on the display unit 181 serves as the origin (0, 0), the horizontal axis serves as an x-axis, and the vertical axis serves as a y-axis.

Figure 5A:
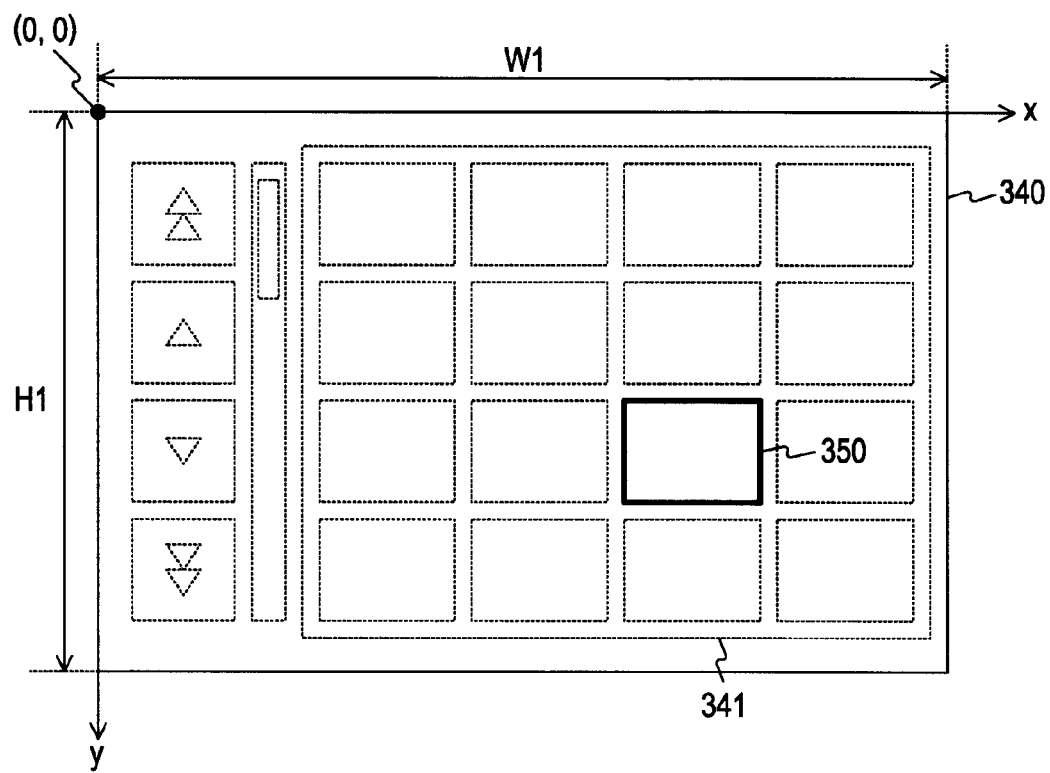
FIGS. 5A and 5B are diagrams illustrating the relationship between an image to be scaled up or down by an image processing unit and a display screen on the display unit according to the first embodiment of the present invention.

FIG. 5A illustrates a rectangle 340 corresponding to a content selection screen. In the rectangle 340, thumbnail images, operation buttons, and a scroll bar arranged on the content selection screen (e.g., the content selection screen 300 illustrated in FIG. 3B) are indicated with broken lines (however, only a rectangle 350 is indicated with a solid line). Here, the length in the x-axis direction of the rectangle 340 is represented by W1 and the length in the y-axis direction is represented by H1. In this example, a description will be given about a case where an image arranged at the position of the rectangle 350 indicated with a bold solid line is scaled up to the size of the rectangle 340 and a case where an image having the size of the rectangle 340 is scaled down to arrange the image at the position of the rectangle 350.

Figure 5B:
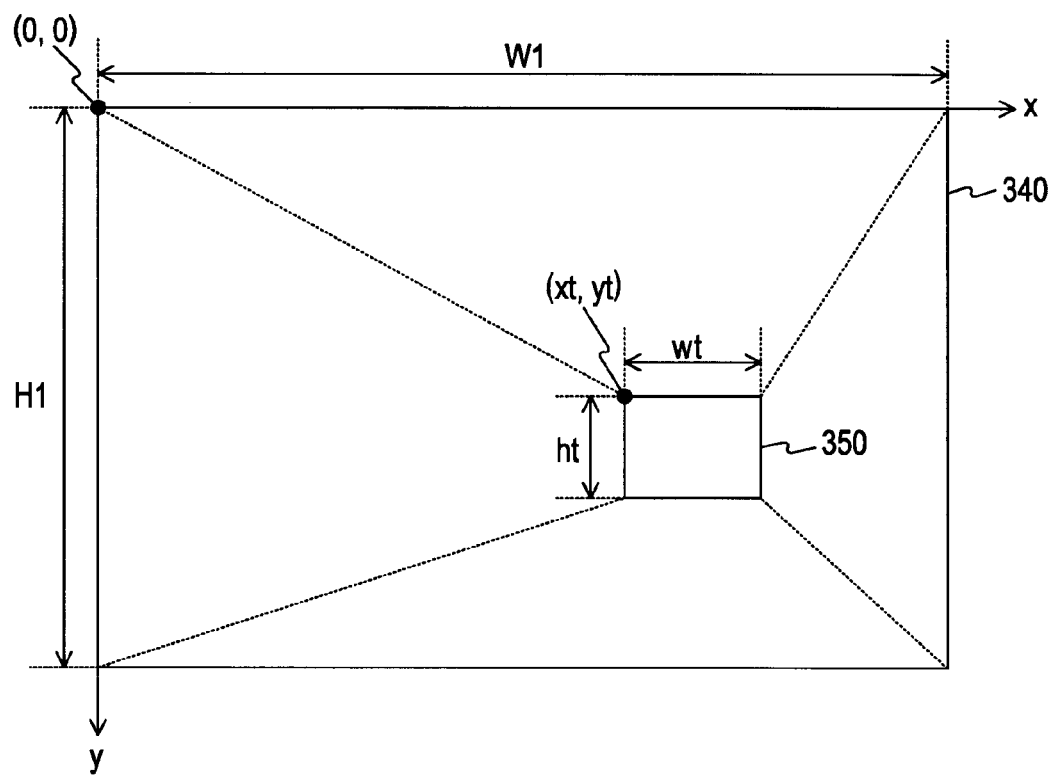

FIG. 5B illustrates the rectangle 340 in a case where the broken lines indicating thumbnail images and the like are erased and where only the rectangle 350 is arranged in the rectangle 340 illustrated in FIG. 5A. In the rectangle 340 illustrated in FIG. 5B, the point at the upper-left corner of the rectangle 350 has coordinates (xt, yt), the length of one side in the x-axis direction of the rectangle 350 is represented by wt, and the length of one side in the y-axis direction is represented by ht. Also, FIG. 5B illustrates a case where the vertices of the rectangle 340 and the vertices of the rectangle 350 are connected by broken lines, respectively.

First, a description will be given about a case where the position of the rectangle 350 serves as a reference position and where an animation process is performed by sequentially scaling up an image from the reference position. Here, the point at the upper-left corner of the rectangle corresponding to an image as a target of the animation process has coordinates (x, y), the length of one side in the x-axis direction of this rectangle is represented by w, and the length of one side in the y-axis direction is represented by h. In this case, the position and size of the image as a target of the animation process are calculated using the following equations 1 to 4.

$$x = xt - xt \times a \qquad \text{equation 1}$$

$$y = yt - yt \times a \qquad \text{equation 2}$$

$$w = wt + (W1 - wt) \times a \qquad \text{equation 3}$$

$$h = ht + (H1 - ht) \times a \qquad \text{equation 4}$$

Here, "a" is a parameter that varies over time. For example, the parameter "a" is sequentially determined in accordance with the curve in the graph illustrated in FIG. 7.

Figure 7:
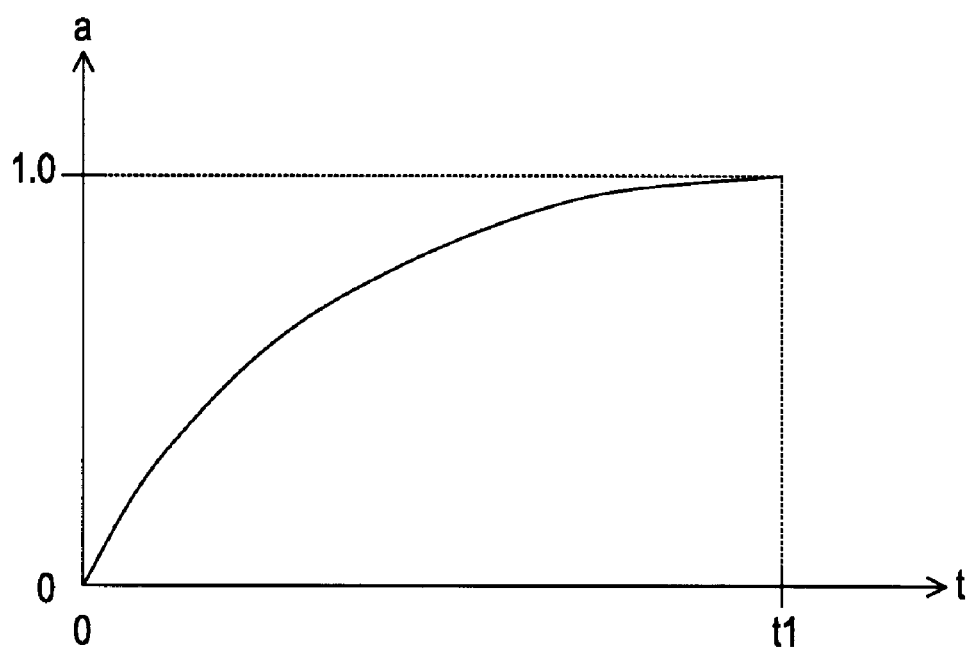
FIG. 7 is a graph illustrating the relationship between a time axis and a parameter "a" that is used to scale up or down an image by the image processing unit according to the first embodiment of the present invention.

FIG. 7 is a graph illustrating the relationship between a time axis and the parameter "a" that is used when an image is scaled up or down by the image processing unit 240 according to the first embodiment of the present invention. In the graph illustrated in FIG. 7, the horizontal axis serves as a time axis (t) and the vertical axis serves as an axis indicating the parameter "a". For example, in the graph illustrated in FIG. 7, a start time of an image scale-up process is represented by t=0, whereas an end time of the image scale-up process is represented by t=t1. As illustrated in FIG. 7, in the first embodiment of the present invention, an image significantly changes first during scaling up, but the change rate of the image decreases over time. That is, a scale-up process is performed while decreasing a scale-up rate per unit time. Accordingly, a user-friendly animation display based on a human visual characteristic can be realized at switching between the content selection screen and the content reproduction screen.

Figure 6A:
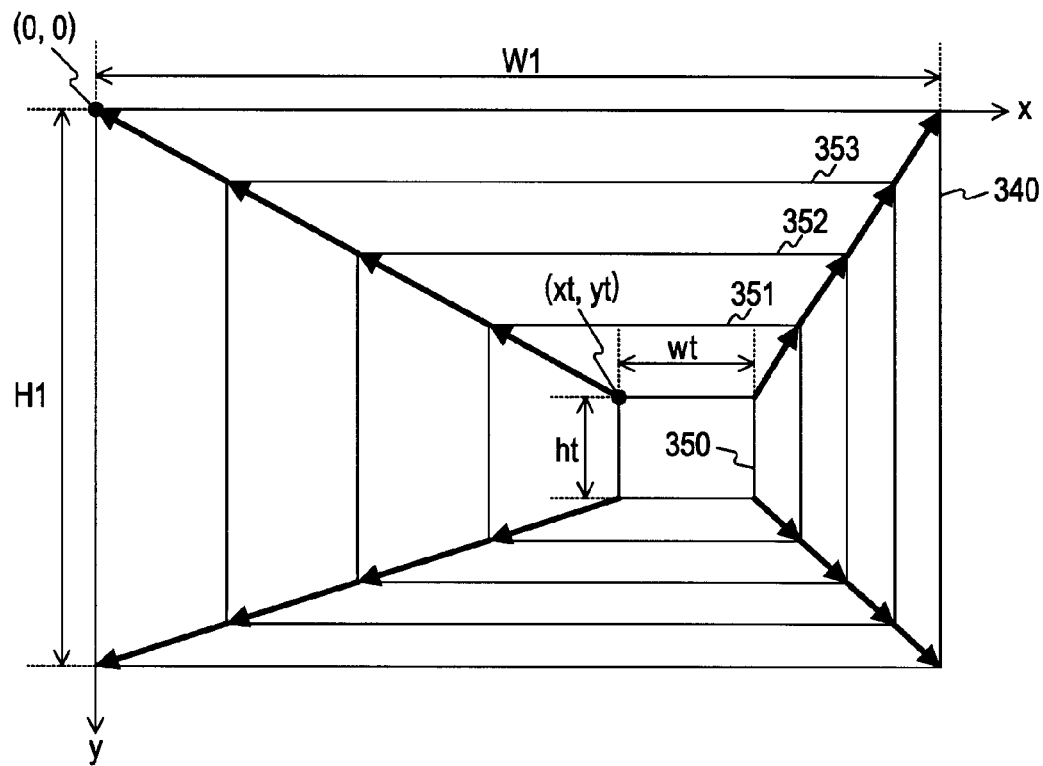
FIGS. 6A and 6B are diagrams illustrating the relationship between an image to be scaled up or down by the image processing unit and a display screen on the display unit according to the first embodiment of the present invention.
Figure 8:
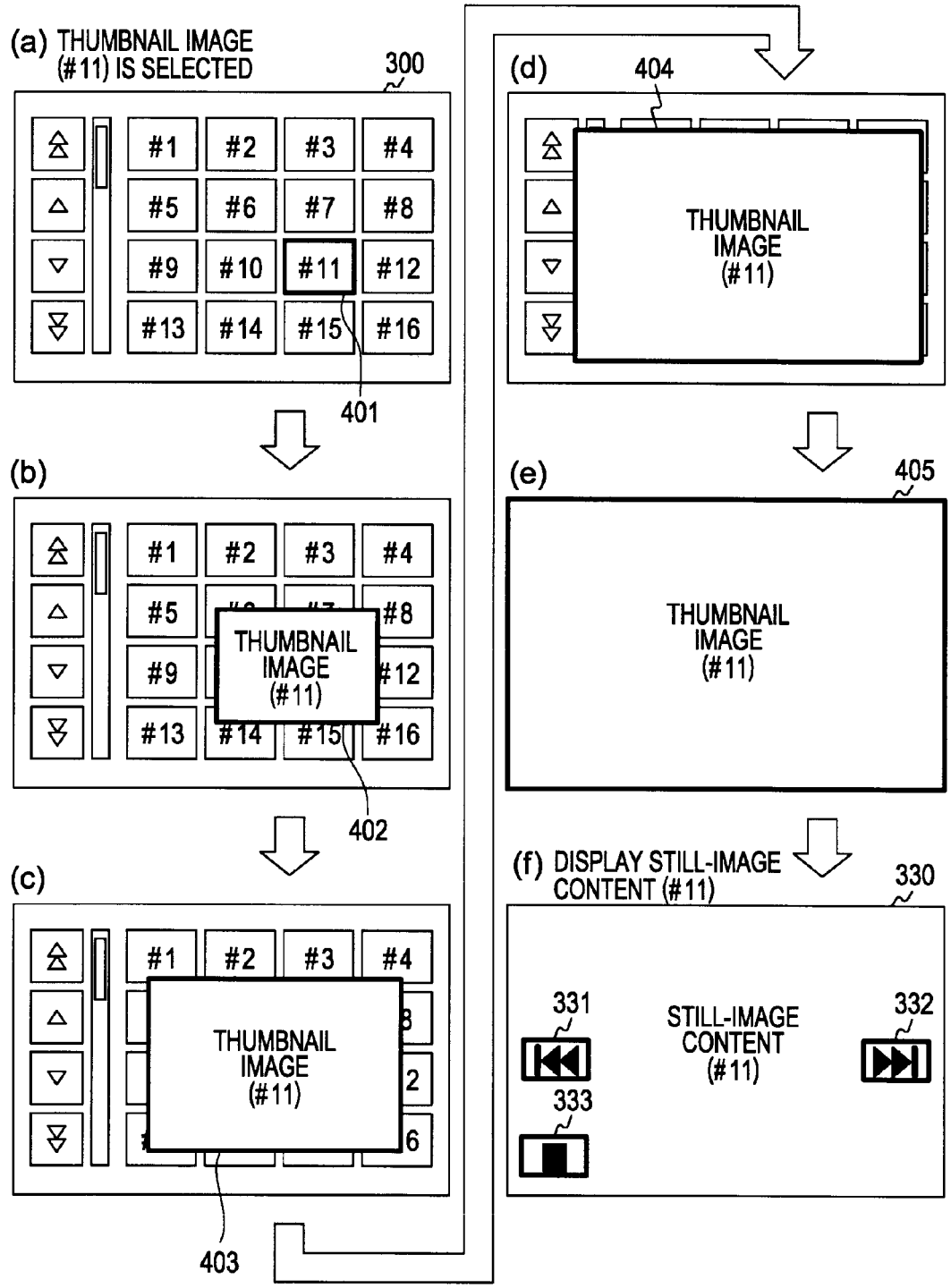
FIG. 8 is a diagram illustrating transition of a display screen displayed on the display unit according to the first embodiment of the present invention.
Figure 10:
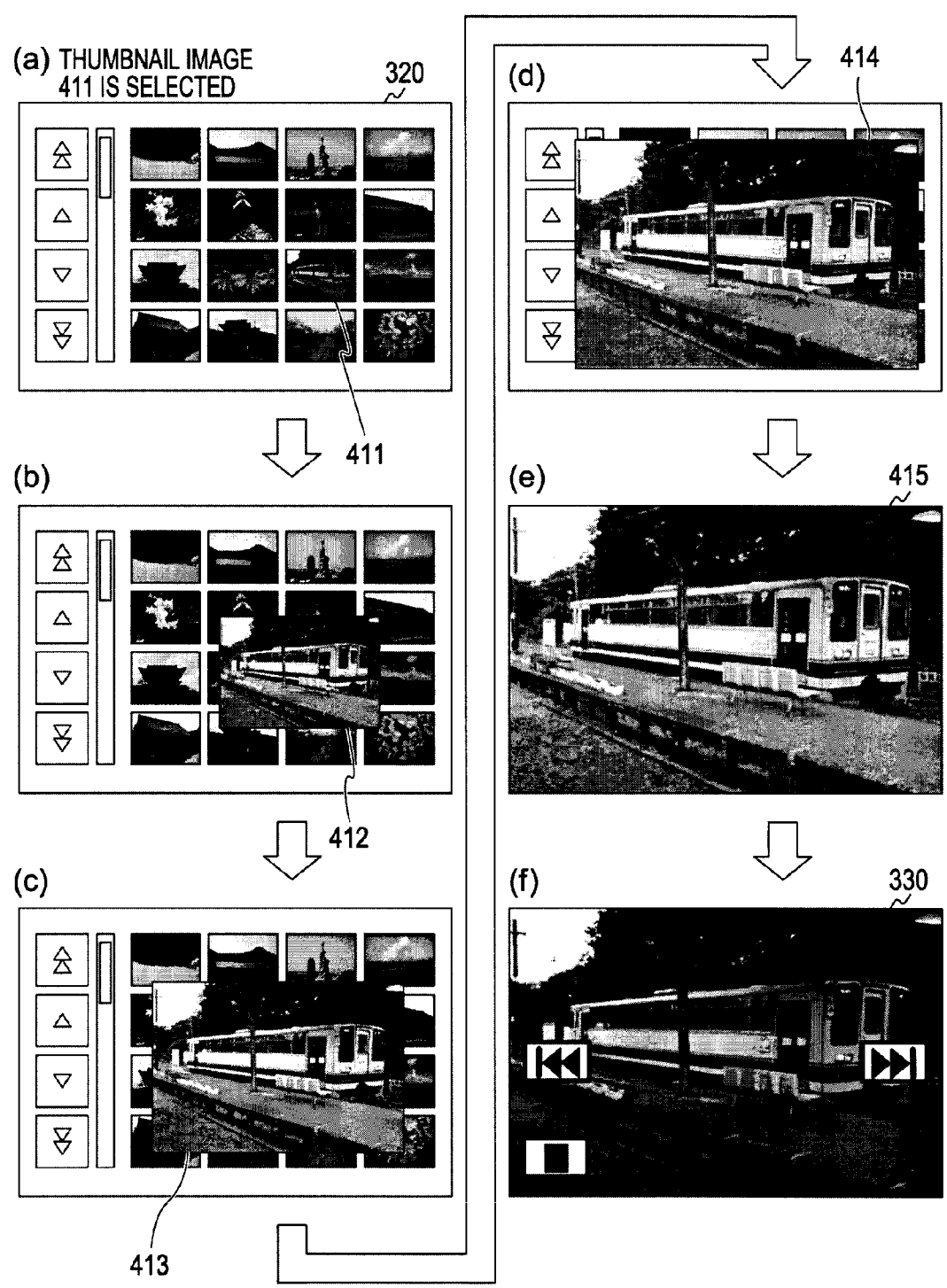
FIG. 10 is a diagram illustrating transition of a display screen displayed on the display unit according to the first embodiment of the present invention.

FIG. 6A schematically illustrates an example of transition of an image that is scaled up using equations 1 to 4. For example, the individual thumbnail images displayed in the thumbnail image display area 310 of the content selection screen 320 illustrated in part (a) of FIG. 4 are held in the image holding unit 230. When a selection operation for selecting the thumbnail image 321 on the content selection screen 320 is received by the operation receiving unit 210, the image processing unit 240 performs a sequential scale-up process on the thumbnail image 321 held in the image holding unit 230. The display control unit 250 causes the display unit 181 to display the thumbnail image that is being sequentially scaled up in the scale-up process. That is, the thumbnail image 321 corresponding to the rectangle 350 is sequentially scaled up to the size of the rectangle 340. For example, images that are scaled up to the sizes of rectangles 351, 352, 353, and 340 are sequentially displayed on the display unit 181. In this case, for example, the individual vertices of the image that is being scaled up shift along the lines connecting the vertices of the rectangle 350 and the vertices of the rectangle 340. After the thumbnail image 321 corresponding to the rectangle 350 has been scaled up to the size of the rectangle 340, the display control unit 250 causes the display unit 181 to display the still-image content corresponding to the thumbnail image 321. Display examples of this case are illustrated in FIGS. 8 to 10. In this example, only four rectangles are illustrated as representative for transition of an image from the rectangle 350 to the rectangle 340 for easy explanation. However, a scale-up process can be performed in five steps or more in accordance with the curve illustrated in FIG. 7 so as to display images.

Next, a description will be given about a case of performing an animation process while sequentially scaling down an image from the position of the rectangle 340. Here, the position of the rectangle 350 serves as a reference position. Here, the point at the upper-left corner of the rectangle of the thumbnail image corresponding to an image as a target of the animation process has coordinates (x, y), the length of one side in the x-axis direction of this rectangle is represented by w, and the length of one side in the y-axis direction is represented by h. In this case, the position and size of the image as a target of the animation process are calculated using the following equations 5 to 8.

$$x = xt \times a \qquad \text{equation 5}$$

$$y = yt \times a \qquad \text{equation 6}$$

$$w = W1 + (wt - W1) \times a \qquad \text{equation 7}$$

$$h = H1 + (ht - H1) \times a \qquad \text{equation 8}$$

Here, "a" is a parameter that varies over time, as in the case of a scale-up process. For example, the parameter "a" is sequentially determined in accordance with the curve in the graph illustrated in FIG. 7.

Figure 6B:
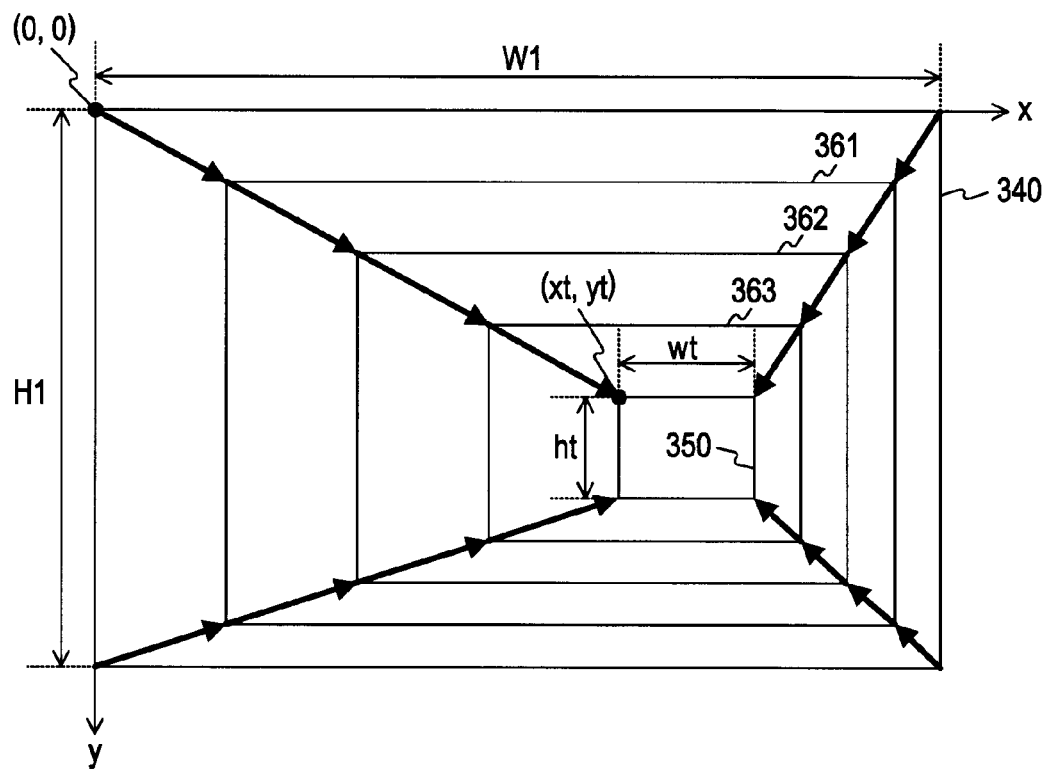
Figure 12:
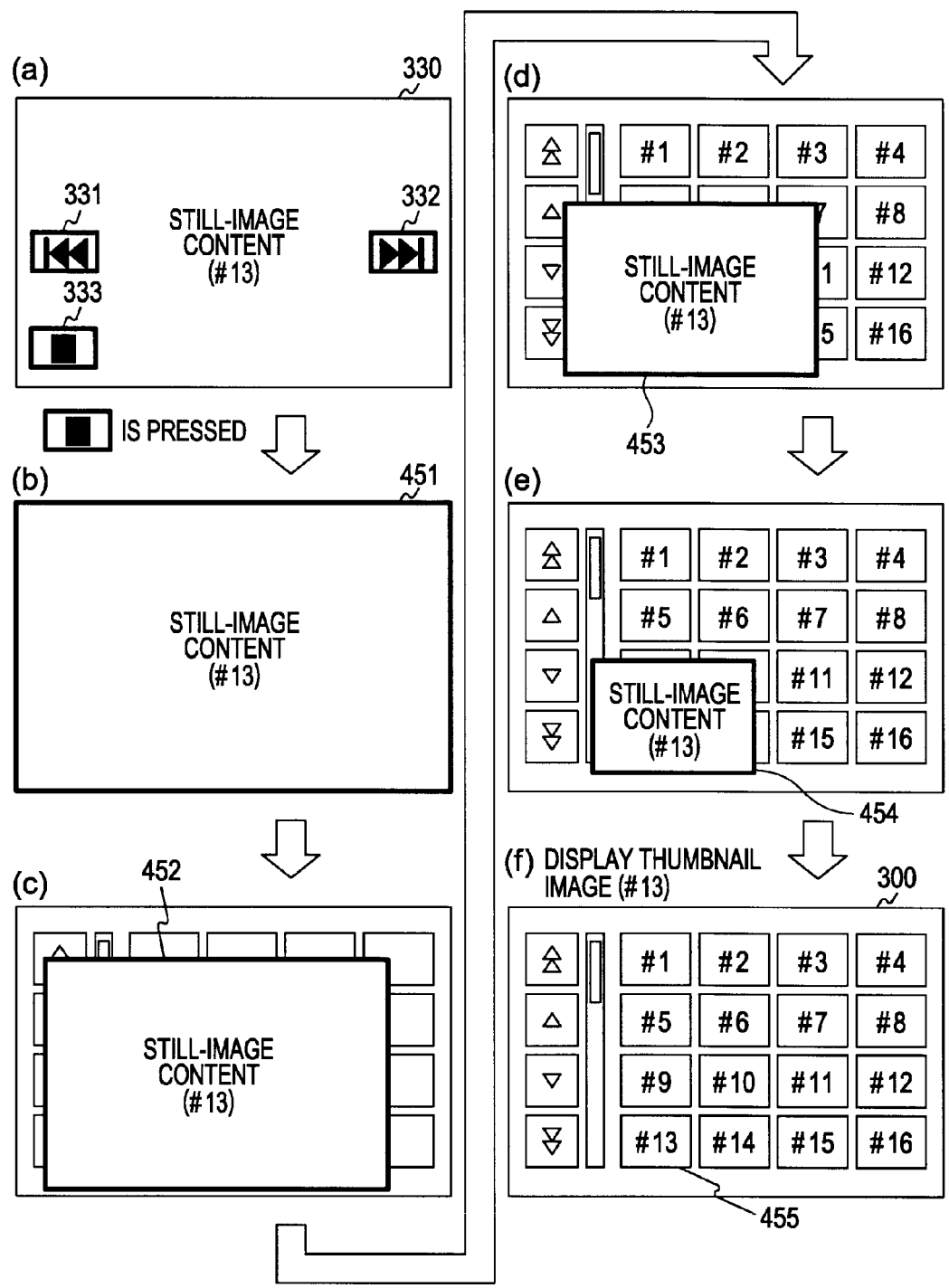
FIG. 12 is a diagram illustrating transition of a display screen displayed on the display unit according to the first embodiment of the present invention.
Figure 13:
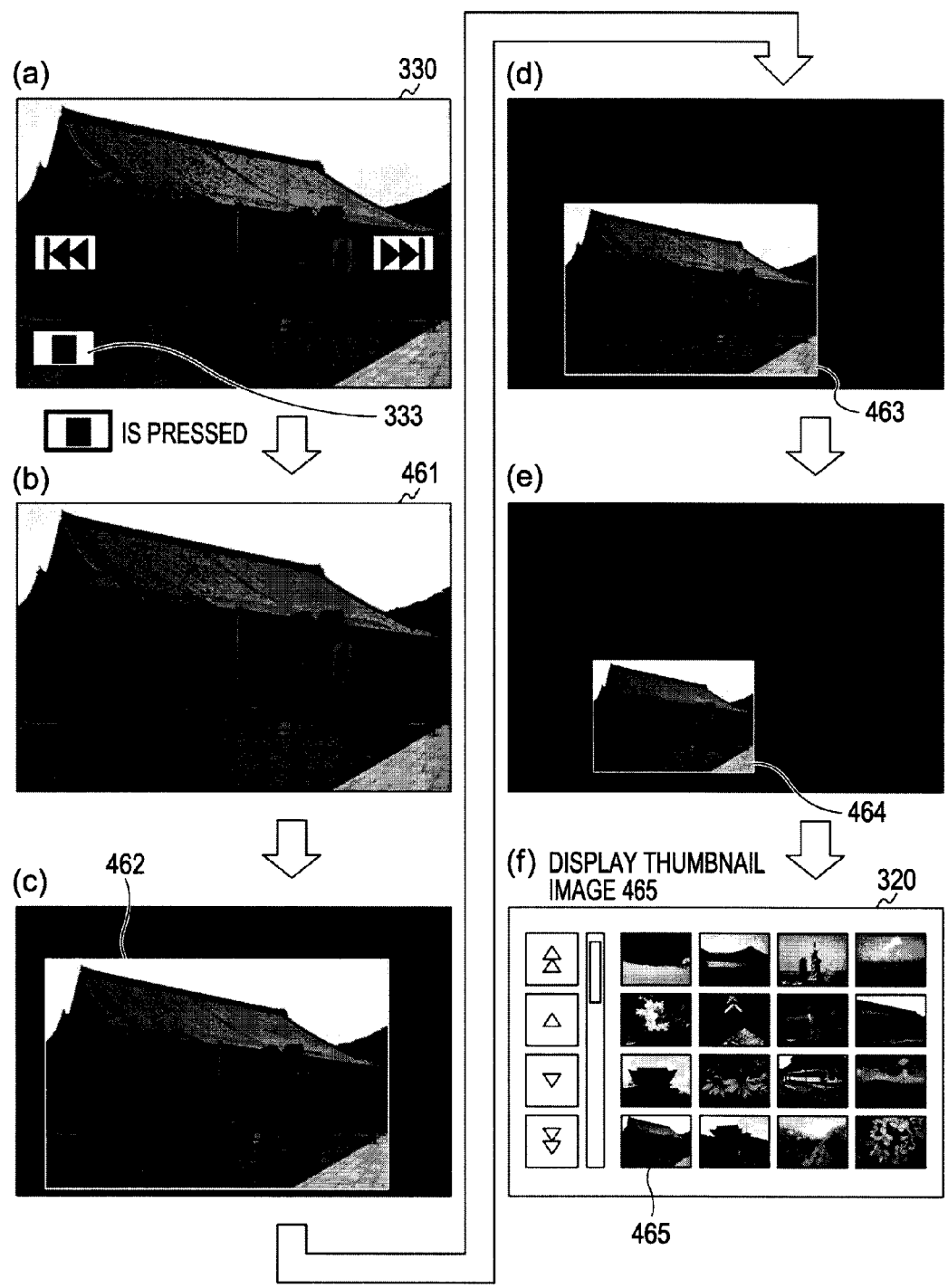
FIG. 13 is a diagram illustrating transition of a display screen displayed on the display unit according to the first embodiment of the present invention.
Figure 14:
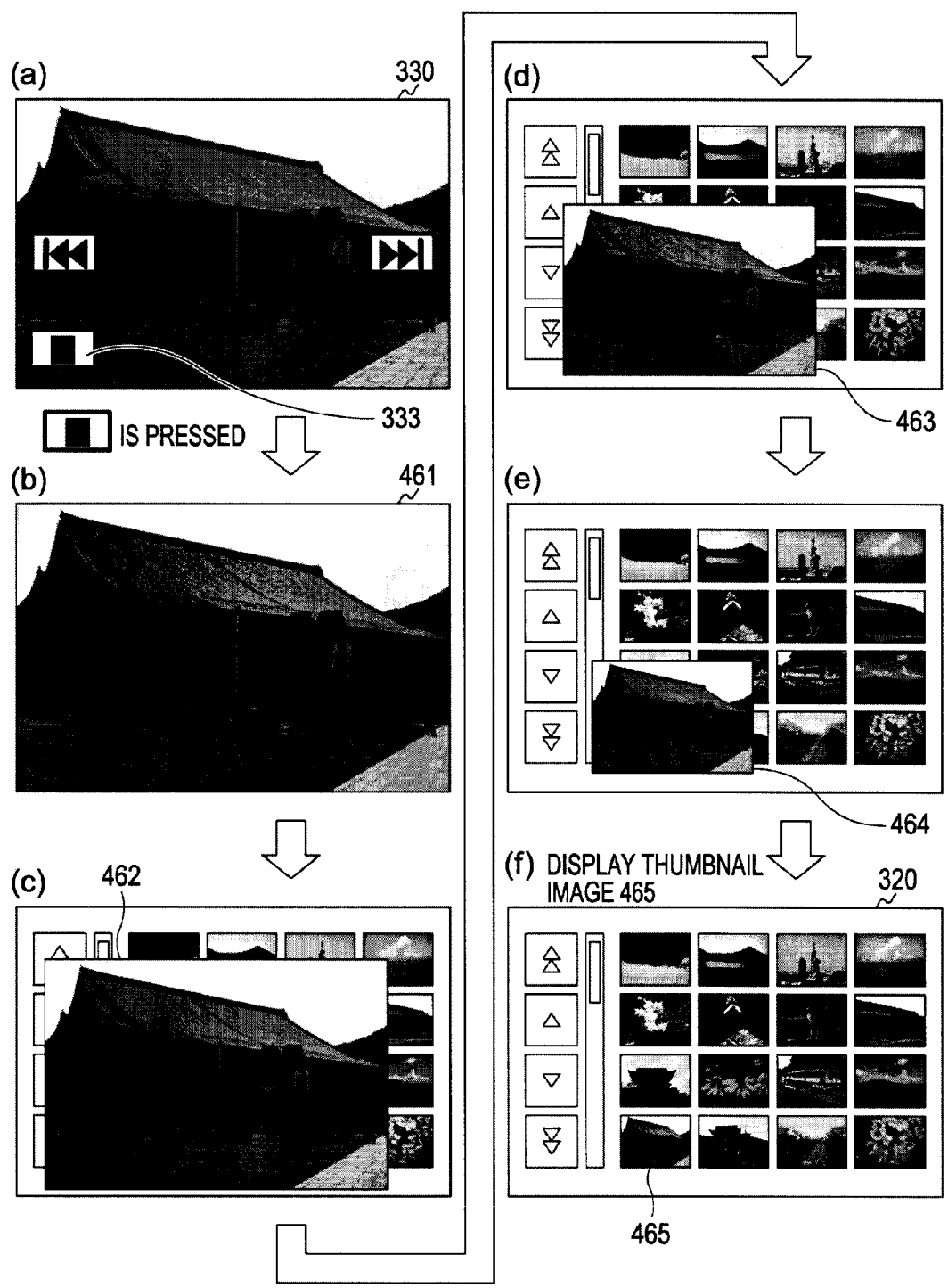
FIG. 14 is a diagram illustrating transition of a display screen displayed on the display unit according to the first embodiment of the present invention.

FIG. 6B schematically illustrates an example of transition of an image that is scaled down using equations 5 to 8. For example, the still-image content displayed on the content reproduction screen 330 illustrated in part (b) of FIG. 4 is held in the image holding unit 230. When a press operation for pressing the operation button 333 on the content reproduction screen 330 is received by the operation receiving unit 210, the image processing unit 240 performs a sequential scale-down process on the still-image content held in the image holding unit 230. The display control unit 250 causes the display unit 181 to display the still-image content that is being sequentially scaled down in the scale-down process. That is, the still-image content corresponding to the rectangle 340 is sequentially scaled down to the size of the rectangle 350. For example, images that are scaled down to the sizes of rectangles 361, 362, 363, and 350 are sequentially displayed on the display unit 181. In this case, for example, the individual vertices of the image that is being scaled down shift along the lines connecting the vertices of the rectangle 350 and the vertices of the rectangle 340. After the still-image content corresponding to the rectangle 340 has been scaled down to the size of the rectangle 350, the display control unit 250 causes the display unit 181 to display the thumbnail image 321. Display examples of this case are illustrated in FIGS. 12 to 14. In this example, only four rectangles are illustrated as representative for transition of an image from the rectangle 340 to the rectangle 350 for easy explanation. However, a scale-down process can be performed in five steps or more in accordance with the curve illustrated in FIG. 7 so as to display images.

Example of Display Control on Content Selection Screen and Content Reproduction Screen FIGS. 8 to 10 are diagrams illustrating transition of a display screen displayed on the display unit 181 according to the first embodiment of the present invention. FIG. 8 illustrates transition of the display screen in a case where a selection operation is performed on the content selection screen 300 illustrated in FIG. 3B. FIG. 9 illustrates transition of the display screen in a case where a selection operation is performed on the content selection screen 320 illustrated in part (a) of FIG. 4. FIG. 10 illustrates a modification of the transition of the display screen illustrated in FIG. 9.

Part (a) of FIG. 8 illustrates the content selection screen 300 that is the same as the content selection screen 300 illustrated in FIG. 3B. In part (a) of FIG. 8, some of the characters and reference numerals on the content selection screen 300 illustrated in FIG. 3B are omitted. As illustrated in part (a) of FIG. 8, when a selection operation for selecting a thumbnail image (#11) 401 is performed on the content selection screen 300, for example, the selected thumbnail image (#11) is displayed while being sequentially scaled up in accordance with equations 1 to 4. For example, as illustrated in parts (b) to (e) of FIG. 8, thumbnail images (#11) 402 to 405 obtained through sequential scaling-up according to equations 1 to 4 are displayed while being overlaid on the content selection screen 300. Subsequently, as illustrated in part (e) of FIG. 8, when the thumbnail image (#11) 405 having the same size as that of the content reproduction screen is obtained through scaling-up according to equations 1 to 4, the scale-up process of the thumbnail image (#11) ends.

Part (f) of FIG. 8 illustrates the content reproduction screen 330 that displays the still-image content (#11) corresponding to the thumbnail image (#11). The operation buttons 331 to 333 provided on the content reproduction screen 330 are the same as the operation buttons 331 to 333 illustrated in part (b) of FIG. 4, and thus are denoted by the same reference numerals and the description thereof is omitted here. As illustrated in part (f) of FIG. 8, after the scale-up process of the thumbnail image (#11) has ended, the display control unit 250 causes the still-image content (#11) corresponding to the thumbnail image (#11) to be displayed.

Part (a) of FIG. 9 illustrates the content selection screen 320 that is the same as the content selection screen 320 illustrated in part (a) of FIG. 4. In part (a) of FIG. 9, some of the reference numerals on the content selection screen 320 illustrated in part (a) of FIG. 4 are omitted. As illustrated in part (a) of FIG. 9, when a selection operation for selecting a thumbnail image 411 is performed on the content selection screen 320, for example, the selected thumbnail image 411 is displayed while being sequentially scaled up in accordance with equations 1 to 4. Here, in the example illustrated in FIG. 9, when a selection operation is performed on the content selection screen 320, the content selection screen 320 is changed to a solid-black screen, and thumbnail images 412 to 415 obtained through sequential scaling-up are overlaid on the solid-black screen. For example, as illustrated in parts (b) to (e) of FIG. 9, the thumbnail images 412 to 415 obtained through sequential scaling-up according to equations 1 to 4 are displayed while being overlaid on the solid-black screen. Subsequently, as illustrated in part (e) of FIG. 9, when the thumbnail image 415 having the same size as that of the content reproduction screen is obtained through scaling-up according to equations 1 to 4, the scale-up process of the thumbnail image ends.

Part (f) of FIG. 9 illustrates the content reproduction screen 330 for displaying the still-image content corresponding to the thumbnail image 411. The content reproduction screen 330 illustrated in part (f) of FIG. 9 is the same as the content reproduction screen 330 illustrated in part (b) of FIG. 4, and thus the description thereof is omitted here. In part (f) of FIG. 9, some of the reference numerals on the content reproduction screen 330 illustrated in part (b) of FIG. 4 are omitted. As illustrated in part (f) of FIG. 9, after the scale-up process of the thumbnail image has ended, the display control unit 250 causes the still-image content corresponding to the thumbnail image 411 to be displayed.

The example illustrated in FIG. 10 is a modification of the example illustrated in FIG. 9. In this modification, when a selection operation is performed on the content selection screen 320, the thumbnail images 412 to 415 obtained through sequential scaling-up are overlaid without changing the content selection screen 320 to a solid-black screen. This modification is the same as the example illustrated in FIG. 9 except that the thumbnail images 412 to 415 obtained through sequential scaling-up are overlaid without changing the content selection screen 320 to a solid-black screen, and thus the corresponding description is omitted. The display forms illustrated in FIGS. 9 and 10 can be changed by a user operation.

FIG. 11 is a diagram illustrating transition of the content reproduction screen on the display unit 181 according to the first embodiment of the present invention. The content reproduction screen 330 illustrated in part (a) of FIG. 11 is the same as the content reproduction screen 330 illustrated in part (b) of FIG. 4.

Part (b) of FIG. 11 illustrates a display example in a case where a press operation of the operation button 332 is performed on the content reproduction screen 330 illustrated in part (a) of FIG. 11. That is, on the content reproduction screen 330 illustrated in part (b) of FIG. 11, the still-image content corresponding to the thumbnail image 323 illustrated in part (a) of FIG. 4 is displayed.

Part (c) of FIG. 11 illustrates a display example in a case where a press operation of the operation button 332 is performed on the content reproduction screen 330 illustrated in part (b) of FIG. 11. That is, on the content reproduction screen 330 illustrated in part (c) of FIG. 11, the still-image content corresponding to a thumbnail image 324 illustrated in part (a) of FIG. 4 is displayed. In this way, by performing press operations of the operation buttons 331 and 332 on the content reproduction screen 330, a user can display desired content.

Here, when a press operation of the operation button 333 is performed on the content reproduction screen 330 illustrated in part (c) of FIG. 11, the content selection screen 320 illustrated in part (a) of FIG. 4 is displayed, for example. An image scale-down process is performed at the switching from the content reproductions screen 330 to the content selection screen 320. This scale-down process will be described in detail with reference to FIGS. 12 to 14.

FIGS. 12 to 14 are diagrams illustrating transition of the display screen displayed on the display unit 181 according to the first embodiment of the present invention. FIG. 12 illustrates transition of the display screen in a case where a press operation of the operation button 333 is performed on the content reproduction screen 330. FIG. 13 illustrates transition of the display screen in a case where a press operation of the operation button 333 is performed on the content reproduction screen 330 illustrated in part (c) of FIG. 11. FIG. 14 illustrates a modification of the transition of the display screen illustrated in FIG. 13.

Part (a) of FIG. 12 illustrates the content reproduction screen 330 on which the still-image content (#13) is displayed. As illustrated in part (a) of FIG. 12, when a press operation of the operation button 333 is performed on the content reproduction screen 330, for example, the still-image content (#13) that is displayed at the press operation is displayed while being sequentially scaled down in accordance with equations 5 to 8. For example, as illustrated in parts (b) to (e) of FIG. 12, pieces of still-image content (#13) 451 to 454 obtained through sequential scaling-down according to equations 5 to 8 are displayed while being overlaid on the content selection screen 300. Subsequently, when the still-image content (#13) having the same size as that of the thumbnail image (#13) is obtained through scaling-down according to equations 5 to 8, the scale-down process of the still-image content (#13) ends.

Part (f) of FIG. 12 illustrates the content selection screen 300 that is the same as the content selection screen 300 illustrated in FIG. 3B. In part (f) of FIG. 12, some of the characters and reference numerals on the content selection screen 300 illustrated in FIG. 3B are omitted. As illustrated in part (f) of FIG. 12, after the scale-down process of the still-image content (#13) has ended, the display control unit 250 causes a thumbnail image (#13) 455 corresponding to the still-image content (#13) to be displayed.

Part (a) of FIG. 13 illustrates the content reproduction screen 330 that is the same as the content reproduction screen 330 illustrated in part (c) of FIG. 11. In part (a) of FIG. 13, some of the reference numerals on the content reproduction screen 330 illustrated in part (c) of FIG. 11 are omitted. As illustrated in part (a) of FIG. 13, when a press operation of the operation button 333 is performed on the content reproduction screen 330, for example, the still-image content that is displayed at the press operation is displayed while being sequentially scaled down in accordance with equations 5 to 8. Here, in the example illustrated in FIG. 13, when a press operation of the operation button 333 is performed, the content selection screen 320 is changed to a solid-black screen, and pieces of still-image content 461 to 464 obtained through sequential scaling-down are overlaid on the solid-black screen. For example, as illustrated in parts (b) to (e) of FIG. 13, the pieces of still-image content 461 to 464 obtained through sequential scaling-down according to equations 5 to 8 are displayed while being overlaid on the solid-black screen. Subsequently, when the still-image content having the same size as that of the thumbnail image on the content selection screen 320 is obtained through scaling-down according to equations 5 to 8, the scale-down process of the still-image content ends.

Part (f) of FIG. 13 illustrates the content selection screen 320 that is the same as the content selection screen 320 illustrated in part (a) of FIG. 4. In part (f) of FIG. 13, some of the reference numerals on the content selection screen 320 illustrated in part (a) of FIG. 4 are omitted. As illustrated in part (f) of FIG. 13, after the scale-down process of the still-image content has ended, the display control unit 250 causes a thumbnail image 465 corresponding to the still-image content to be displayed.

The example illustrated in FIG. 14 is a modification of the example illustrated in FIG. 13. In this modification, when a press operation of the operation button 333 is performed on the content reproduction screen 330, the pieces of still-image content 461 to 464 obtained through sequential scaling-down are overlaid without changing the content selection screen 320 to a solid-black screen. This modification is the same as the example illustrated in FIG. 13 except that the pieces of still-image content 461 to 464 obtained through sequential scaling-down are overlaid without changing the content selection screen 320 to a solid-black screen, and thus the corresponding description is omitted. The display forms illustrated in FIGS. 13 and 14 can be changed by a user operation.

Modification of Display Control on Content Selection Screen and Content Reproduction Screen A description has been given about examples of performing an animation process by scaling up or down still-image content or a thumbnail image. Here, for example, a thumbnail image and the still-image content corresponding to the thumbnail image often have different resolutions even if the subject is the same. For this reason, a scaled-up thumbnail image just before still-image content is displayed may be seen as a rough image at the switching from the content selection screen to the content reproduction screen, which may cause unnaturalness. Accordingly, hereinafter, a description will be given about an example of performing an animation process while performing a fade-out process on an image to be scaled up or down. Here, fade-out means a visual expression of sequentially changing a target image over time, for example. For example, a target image is gradually blackened over time, and eventually a solid-black image can be obtained.

Figure 15:
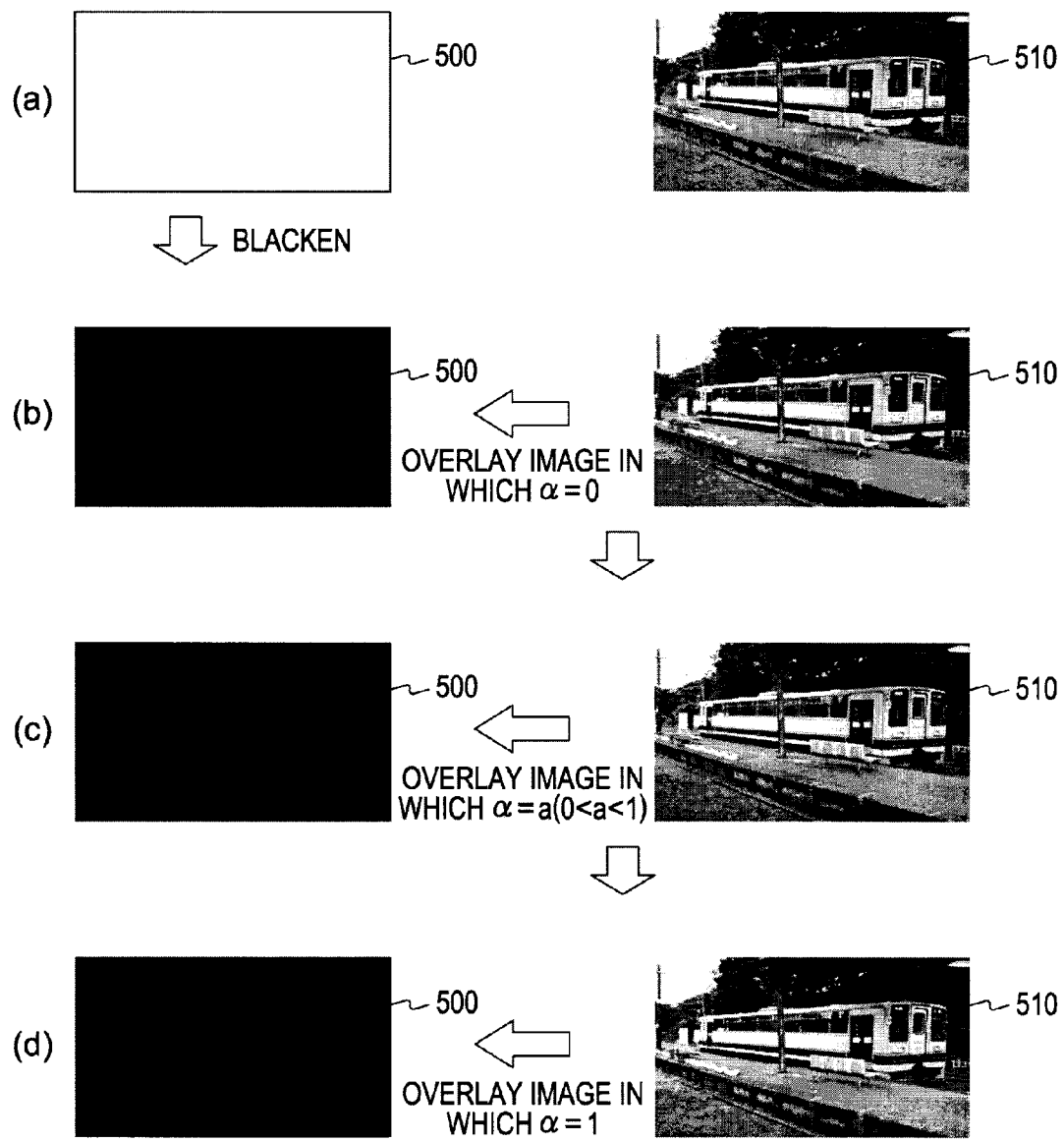
FIG. 15 is a diagram schematically illustrating a fade-out method for fading out an image to be scaled up or down by the image processing unit according to the first embodiment of the present invention.
Figure 16:
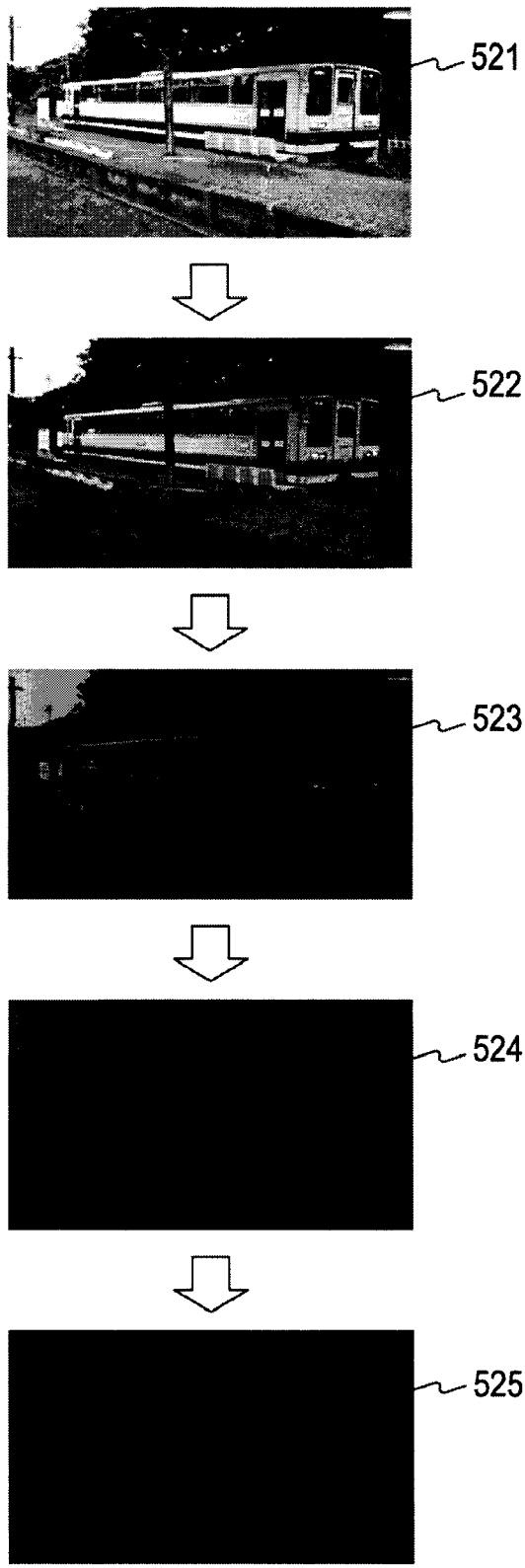
FIG. 16 is a diagram schematically illustrating a fade-out method for fading out an image to be scaled up or down by the image processing unit according to the first embodiment of the present invention.

FIGS. 15 and 16 are diagrams schematically illustrating a fade-out method for fading out an image that is to be scaled up or down by the image processing unit 240 according to the first embodiment of the present invention.

FIG. 15 illustrates, in time series, the relationship between an image 510, which is a target of scaling-up or -down performed by the image processing unit 240, and an α value used to fade out the image 510. The image 510 is, for example, a thumbnail image stored in the content management information storage unit 142 and is the same as the thumbnail image 321 illustrated in part (a) of FIG. 4. A target image drawing area 500 is an area where the image 510 is drawn.

Here, the α value is a value indicating transparency, and the transparency of RGB (red, green, and blue) is changed in the range of 0 to 1. For example, a target image is opaque when α=0, and the transparency of the target image increases as the value increases. The target image is completely transparent when α=1. That is, in a case of changing the transparency of an image, a desired transparency can be obtained by changing the α value. In this example, a description will be given about a fade-out method for performing fade-out by increasing the transparency of a target image over time and overlaying the image the transparency of which has been changed on a black image in a case of repeating scaling-up or -down of the target image.

Part (a) of FIG. 15 illustrates the image 510 and the target image drawing area 500 before a fade-out process is performed. Here, in a case of performing a fade-out process, the image processing unit 240 changes the target image drawing area 500 to black, as illustrated in part (b) of FIG. 15. Subsequently, the image processing unit 240 overlays the image 510 in which α=0 on the target image drawing area 500 that has been blackened. As can be understood, the image 510 is opaque when the α value is zero, and thus the image 510 drawn in the target image drawing area 500 is displayed as is on the display unit 181.

Subsequently, as illustrated in part (c) of FIG. 15, the image processing unit 240 blackens the target image drawing area 500, and the image processing unit 240 overlays the image 510 in which α=a(0≦a≦1) on the target image drawing area 500 that has been blackened. Then, the image processing unit 240 repeatedly performs a process of overlaying the image 510 in which α=a(0≦a≦1) on the target image drawing area 500 that has been blackened by sequentially increasing the value of "a". In this case, the transparency of the target image increases as the value of α increases, and thus the image 510 drawn in the target image drawing area 500 is gradually blackened. Here, "a" specified by the curve in the graph illustrated in FIG. 7 can be used.

Subsequently, as illustrated in part (d) of FIG. 15, the image processing unit 240 blackens the target image drawing area 500, and the image processing unit 240 overlays the image 510 in which α=1 on the target image drawing area 500 that has been blackened. Here, when α=1, the image 510 is completely transparent, and thus the image 510 drawn in the target image drawing area 500 is displayed as black on the display unit 181. The transition of the image 510 on which such a fade-out process is being performed by the image processing unit 240 is illustrated in FIG. 16.

Figure 17:
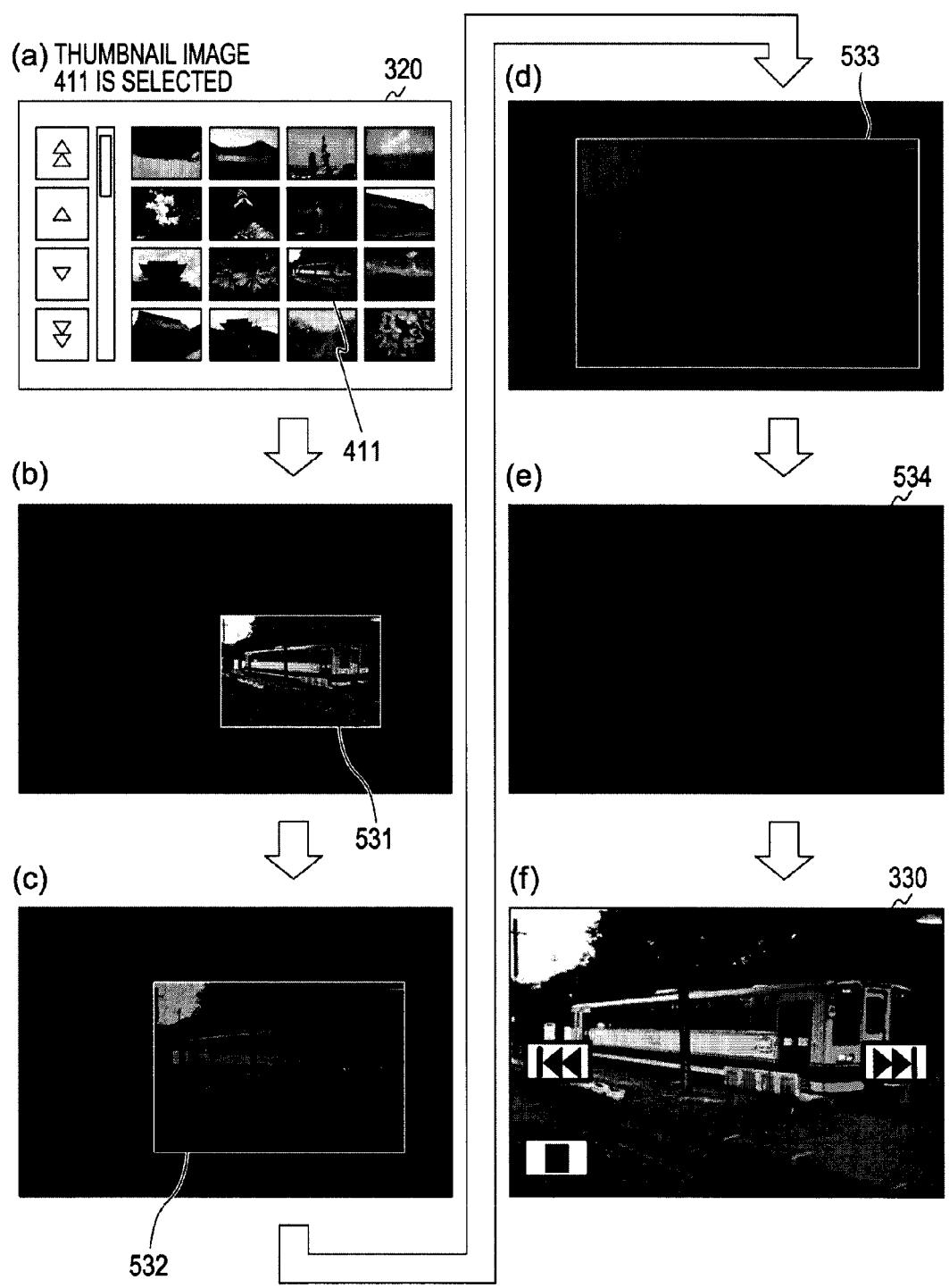
FIG. 17 is a diagram illustrating transition of a display screen displayed on the display unit according to the first embodiment of the present invention.
Figure 18:
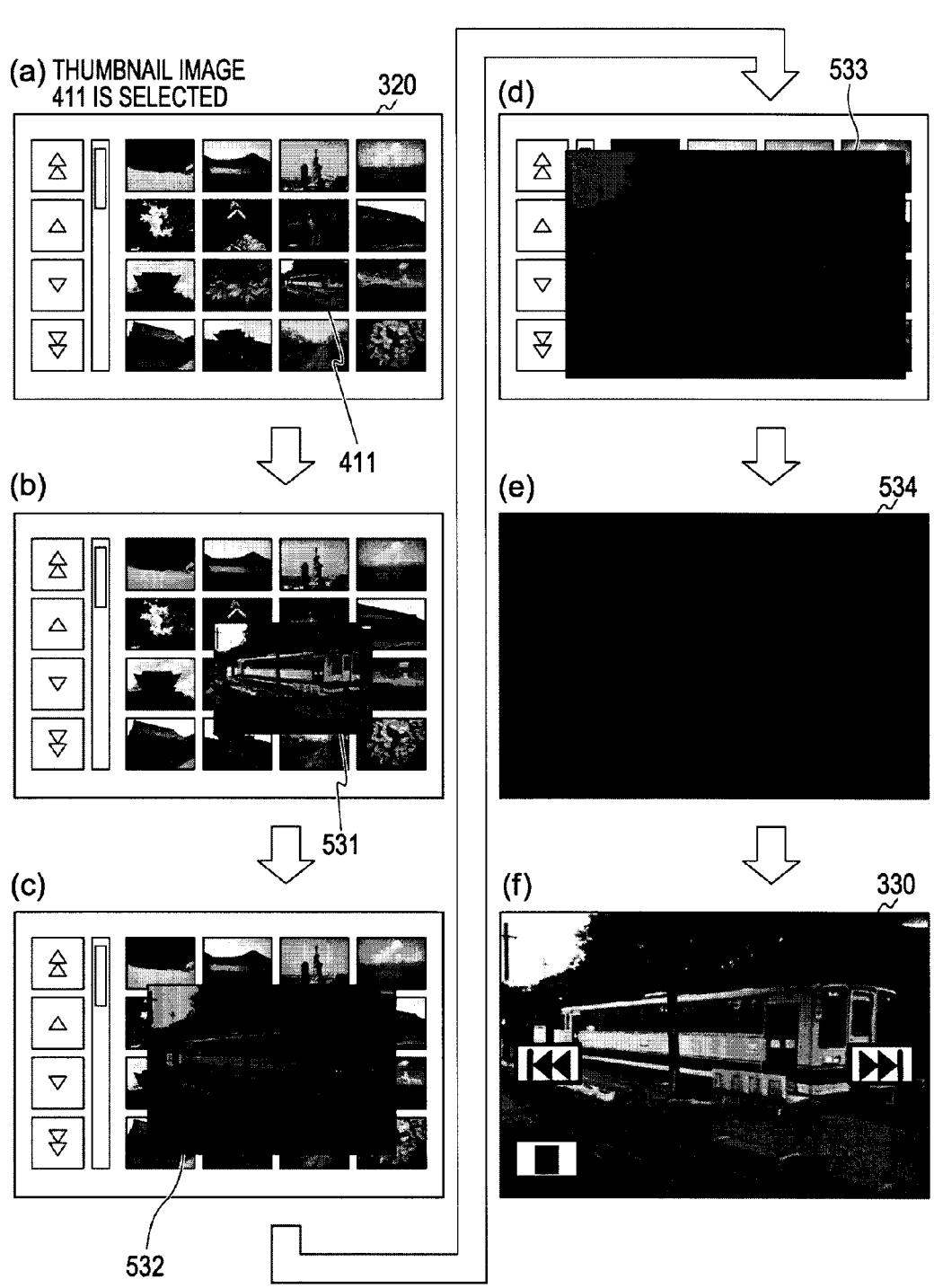
FIG. 18 is a diagram illustrating transition of a display screen displayed on the display unit according to the first embodiment of the present invention.

FIG. 16 illustrates time-series transition of the image on which a fade-out process is being performed by the image processing unit 240. Here, an image 521 is an image obtained by overlaying the image 510 in which α=0 on the target image drawing area 500 that has been blackened. An image 525 is an image obtained by overlaying the image 510 in which α=1 on the target image drawing area 500 that has been blackened. Also, images 522 to 524 are images obtained by overlaying the image 510 in which α=a(0≦a≦1) on the target image drawing area 500 that has been blackened. Note that the value of a increases as the process proceeds from the image 522 to the image 524. Examples of performing such a fade-out process and a scale-up process on a target image by the image processing unit 240 are illustrated in FIGS. 17 and 18. Also, examples of performing a fade-out process and a scale-down process on a target image by the image processing unit 240 are illustrated in FIGS. 19 and 20.

FIGS. 17 to 20 are diagrams illustrating transition of the display screen displayed on the display unit 181 according to the first embodiment of the present invention. FIGS. 17 and 18 illustrate transition of the display screen in a case of displaying an image on which a fade-out process is performed when a selection operation is performed on the content selections screen 320 illustrated in part (a) of FIG. 4. The example illustrated in FIG. 17 is a modification of the example illustrated in FIG. 9, whereas the example illustrated in FIG. 18 is a modification of the example illustrated in FIG. 10. That is, a different point is that the images 412 to 415 as a target of a scale-up process in FIGS. 9 and 10 are replaced by images 531 to 534 on which a fade-out process is performed in FIGS. 17 and 18. In addition, the thumbnail image 411 and the images 531 to 534 illustrated in FIGS. 17 and 18 correspond to the images 521 to 525 illustrated in FIG. 16.

Figure 19:
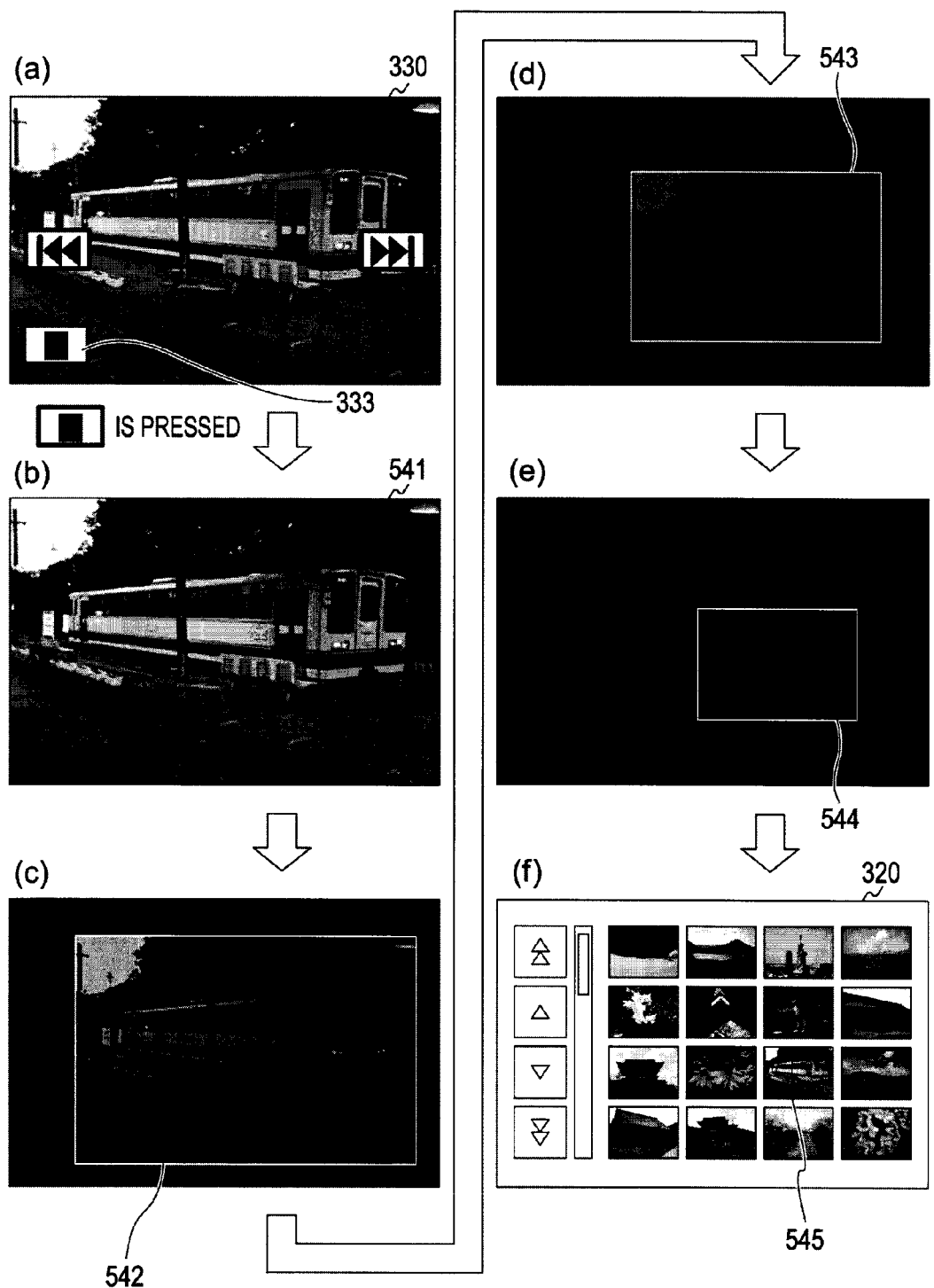
FIG. 19 is a diagram illustrating transition of a display screen displayed on the display unit according to the first embodiment of the present invention.
Figure 20:
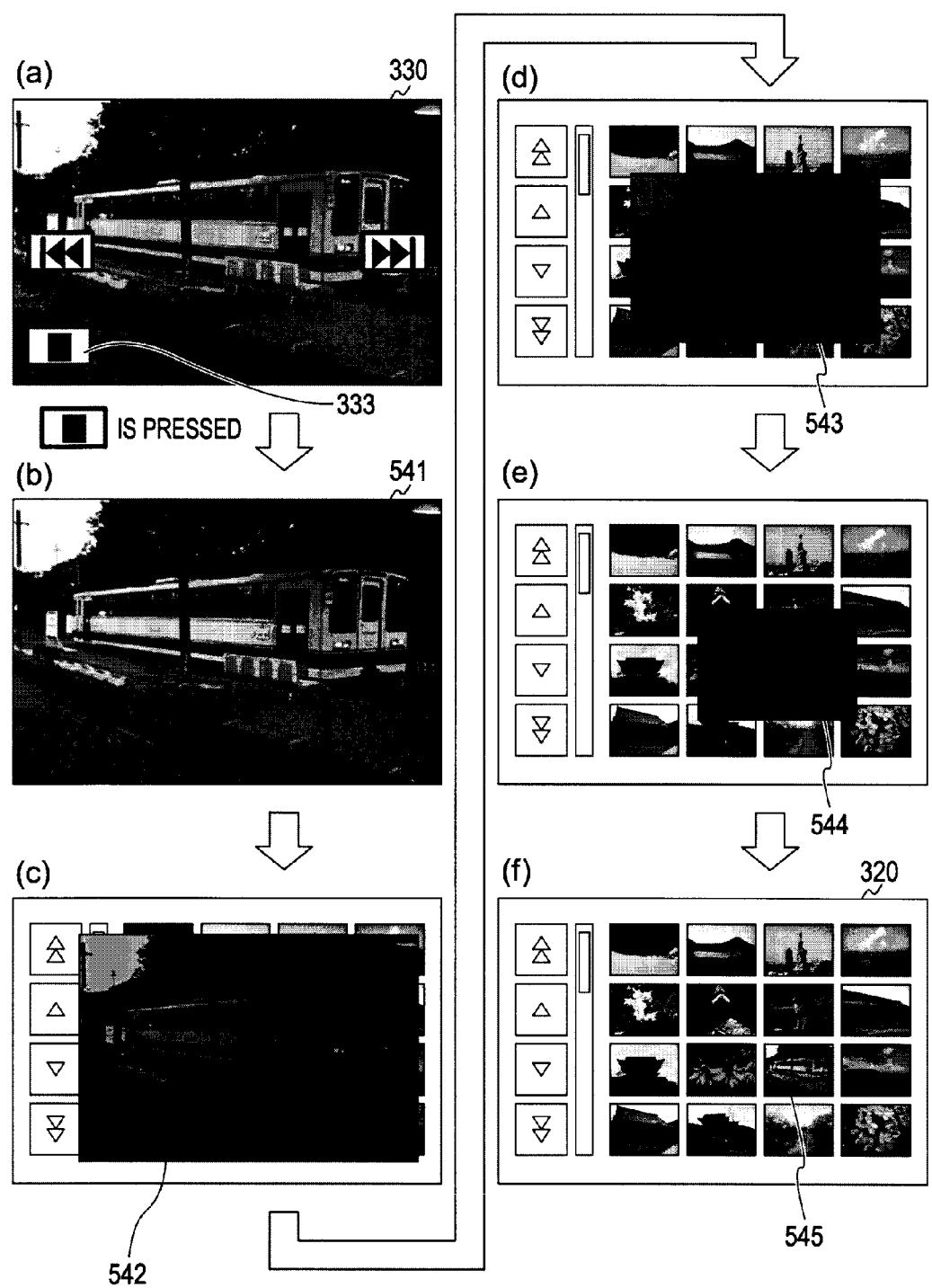
FIG. 20 is a diagram illustrating transition of a display screen displayed on the display unit according to the first embodiment of the present invention.

FIGS. 19 and 20 illustrate transition of the display screen in a case of displaying an image on which a fade-out process is performed when the operation button 333 is pressed on the content reproduction screen 330 illustrated in part (b) of FIG. 4. The example illustrated in FIG. 19 is a modification of the example illustrated in FIG. 13, whereas the example illustrated in FIG. 20 is a modification of the example illustrated in FIG. 14. That is, compared to the examples illustrated in FIGS. 13 and 14, an image as a target of a scale-down process is different, and another different point is that a fade-out process is performed on the image as a target of a scale-down process. In addition, the content image on the content reproduction screen 330 and images 541 to 544 illustrated in FIGS. 19 and 20 correspond to the images 521 to 525 illustrated in FIG. 16.

In this way, by performing a fade-out process on an image as a target of scaling-up or -down, even when a thumbnail image is different from the still-image content corresponding to the thumbnail image, unnaturalness due to the difference can be reduced.

In this example, a description has been given about a case of fading out a target image into black by changing the transparency of the target image over time. Alternatively, the target image may be faded out into a color other than black. Also, color information of the target image may be changed over time using another method. For example, the target image (e.g., a thumbnail image) may be faded out by gradually increasing the transparency of the target image and the image corresponding to the target image (e.g., a content image) may be faded in. Also, for example, shading of monochrome or sepia of the target image may be changed over time. Also, for example, a method for decreasing the resolution of the target image overt time or a method for changing the color from color to monochrome may be used.

Operation Example of Imaging Apparatus

Next, an operation of the imaging apparatus 100 according to the first embodiment of the present invention will be described with reference to the drawings.

Figure 21:
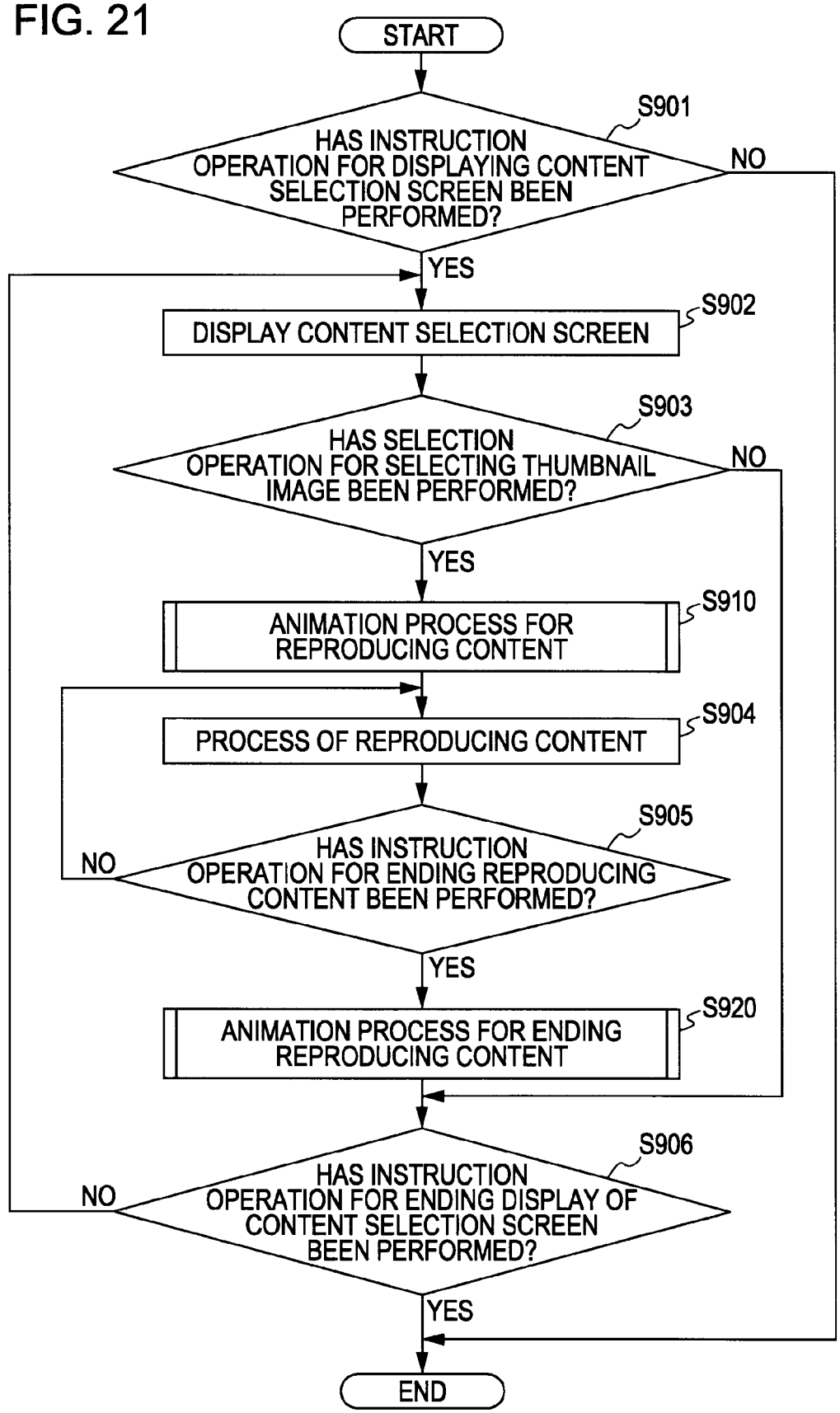
FIG. 21 is a flowchart illustrating a process procedure of a display control process performed by the imaging apparatus according to the first embodiment of the present invention.

FIG. 21 is a flowchart illustrating a process procedure of a display control process performed by the imaging apparatus 100 according to the first embodiment of the present invention. Here, a display control process in a case where a content reproduction mode is set will be described as an example. In this example, a fade-out process is performed on an image to be scaled up or down, and the background of the image to be scaled up or down is set to black at the fade-out process.

First, it is determined whether an instruction operation for displaying a content selection screen has been performed (step S901). In a case where an instruction operation for displaying the content selection screen has not been performed, the operation of the display control process ends. In a case where an instruction operation for displaying the content selection screen has been performed (step S901), the display control unit 250 causes the display unit 181 to display the content selection screen (step S902). Step S902 is an example of "displaying" described in the claims. Subsequently, it is determined whether a selection operation for selecting a thumbnail image has been performed on the content selection screen (step S903). In a case where a selection operation for selecting a thumbnail image has not been performed, the process proceeds to step S906. In a case where a selection operation for selecting a thumbnail image has been performed on the content selection screen (step S903), an animation process for reproducing content is performed (step S910). The animation process for reproducing content will be described in detail with reference to FIG. 22.

Subsequently, a process of reproducing content corresponding to the thumbnail image selected on the content selection screen is performed (step S904). Subsequently, it is determined whether an instruction operation for providing an instruction to end reproducing content has been performed (step S905). In a case where an instruction operation for providing an instruction to end reproducing content has not been performed (step S905), the process returns to step S904, where a process of reproducing content is performed. In a case where an instruction operation for providing an instruction to end reproducing content has been performed (step S905), an animation process for ending reproducing content is performed (step S920). The animation process for ending reproducing content will be described in detail with reference to FIG. 23.

Subsequently, it is determined whether an instruction operation for ending display of the content selection screen has been performed (step S906). In a case where an instruction operation for ending display of the content selection screen has not been performed (step S906), the process returns to step S902, where the display control unit 250 causes the display unit 181 to display the content selection screen. In a case where an instruction operation for ending display of the content selection screen has been performed (step S906), the operation of the display control process ends.

Figure 22:
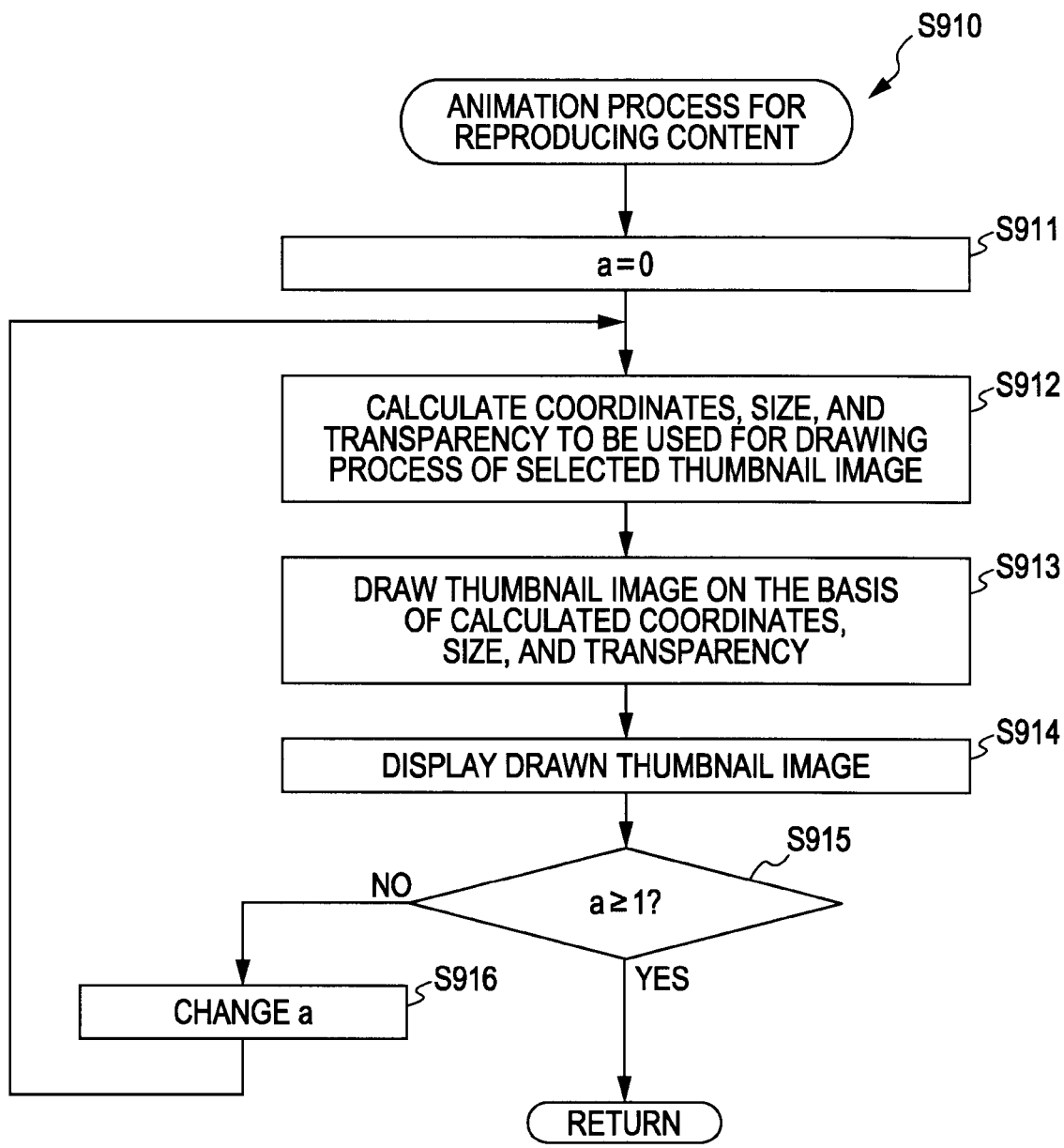
FIG. 22 is a flowchart illustrating an animation process for reproducing content in the process procedure of the display control process performed by the imaging apparatus according to the first embodiment of the present invention.

FIG. 22 is a flowchart illustrating the animation process for reproducing content (the process procedure of step S910 illustrated in FIG. 21) in the process procedure of the display control process performed by the imaging apparatus 100 according to the first embodiment of the present invention.

First, the parameter "a" is initialized to 0 (step S911). Subsequently, the image processing unit 240 calculates the coordinates, size, and transparency to be used for a drawing process of the thumbnail image selected on the content selection screen (step S912). Here, the coordinates and size are calculated using equations 1 to 4, whereas the transparency is calculated on the basis of the α value.

Subsequently, the image processing unit 240 obtains the thumbnail image selected on the content selection screen from the image holding unit 230, and draws the obtained thumbnail image on the basis of the calculated coordinates, size, and transparency (step S913). That is, a process of scaling up the thumbnail image selected on the content selection screen is performed. Steps S912 and S913 are an example of "sequentially scaling up" described in the claims. Subsequently, the display control unit 250 causes the display unit 181 to display the drawn thumbnail image (step S914). In this case, the background of the drawn thumbnail image is solid black. Step S914 is an example of "causing" described in the claims.

Subsequently, it is determined whether the parameter "a" is 1 or more (step S915). That is, it is determined whether the size of the drawn thumbnail image has reached a certain size (the size of the content reproduction screen). In a case where the parameter "a" is not 1 or more (step S915), the parameter "a" is changed (step S916), and the process returns to step S912. For example, the parameter "a" is changed in accordance with the graph illustrated in FIG. 7. In a case where the parameter "a" is 1 or more (step S915), the operation of the animation process for reproducing content ends.

Figure 23:
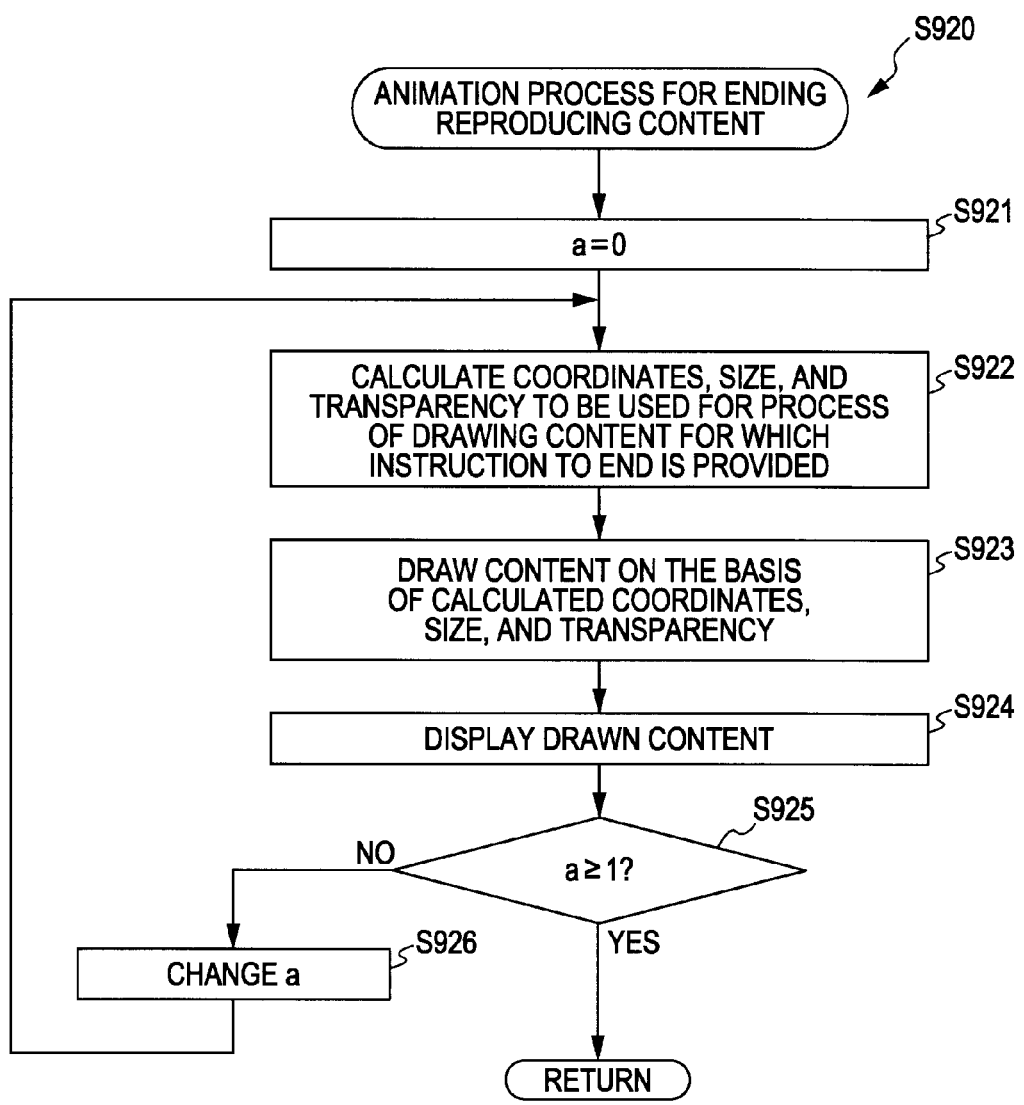
FIG. 23 is a flowchart illustrating an animation process for ending reproducing content in the process procedure of the display control process performed by the imaging apparatus according to the first embodiment of the present invention.

FIG. 23 is a flowchart illustrating the animation process for ending reproducing content (the process procedure of step S920 illustrated in FIG. 21) in the process procedure of the display control process performed by the imaging apparatus 100 according to the first embodiment of the present invention.

First, the parameter "a" is initialized to 0 (step S921). Subsequently, the image processing unit 240 calculates the coordinates, size, and transparency to be used for the process of drawing the content for which an instruction to end is provided on the content reproduction screen (step S922). Here, the coordinates and size are calculated using equations 5 to 8, whereas the transparency is calculated on the basis of the α value.

Subsequently, the image processing unit 240 obtains, from the image holding unit 230, the content for which an instruction to end has been provided on the content reproduction screen, and draws the obtained content on the basis of the calculated coordinates, size, and transparency (step S923). That is, a process of scaling down the content image for which an instruction to end has bee provided on the content reproduction screen is performed. Here, for example, in a case where the content as a target of a scale-down process is moving-image content, the scale-down process is performed using a frame that is displayed on the content reproduction screen when the end instruction is provided. Subsequently, the display control unit 250 causes the display unit 181 to display the drawn content (step S924). In this case, the background of the drawn content is solid black.

Subsequently, it is determined whether the parameter "a" is 1 or more (step S925). That is, it is determined whether the size of the drawn content has reached a certain size (the size of a thumbnail on the content selection screen). In a case where the parameter "a" is not 1 or more (step S925), the parameter "a" is changed (step S926), and the process returns to step S922. For example, the parameter "a" is changed in accordance with the graph illustrated in FIG. 7. In a case where the parameter "a" is 1 or more (step S925), the operation of the animation process for ending reproducing content ends.

In this example, a thumbnail image is used as an image to be scaled up, and content is used as an image to be scaled down. However, an image related to corresponding content can be used as an image to be scaling up or down. For example, corresponding content may be used as an image to be scaled up, and corresponding thumbnail image may be used as an image to be scaled down.

2. Second Embodiment

Functional Configuration Example of Imaging Apparatus

In the first embodiment of the present invention, a description has been given about display examples in a case where a subject included in a thumbnail image is the same as a subject included in the still-image content corresponding to the thumbnail image. In such a case where a subject included in a thumbnail image is the same as a subject included in the still-image content corresponding to the thumbnail image, an image as a target of an animation process is substantially the same as an image that is displayed just after the animation process. Here, assume a case where content is moving-image content, for example. Since moving-image content is composed of a plurality of frames, a case is assumed where a subject included in an image as a target of an animation process is not the same as a subject included in an image that is displayed just after the animation process. For this reason, even when moving-image content is used as content, for example, it is important to easily recognize the correspondence between index images displayed in list form and content to be reproduced. Therefore, in the second embodiment of the present invention, a detailed description will be given with reference to the drawings about an example of sequentially changing an image as a target of an animation process in a case where moving-image content is used as content. Note that the functional configuration according to the second embodiment of the present invention is substantially the same as that of the imaging apparatus 100 according to the first embodiment of the present invention. Thus, hereinafter, a description will be given mainly about a point different from the imaging apparatus 100.

The content management information stored in the content management information storage unit 142 illustrated in FIG. 2 includes resume information about a frame obtained at the end of an immediately-preceding reproduction of moving-image content. The resume information will be described in detail with reference to FIG. 25.

The image processing unit 240 illustrated in FIG. 2 sequentially scales up, along a time axis, individual frames from the first frame to the frame at a resume position among individual frames constituting moving-image content corresponding to a thumbnail image selected on the content selection screen, for example. Also, for example, the image processing unit 240 sequentially scales up, in the opposite direction of the time axis, individual frames from the frame corresponding to the thumbnail image to the first frame among the individual frames constituting the moving-image content corresponding to the selected thumbnail image. Also, for example, the image processing unit 240 sequentially scales down individual frames from the frame corresponding to the thumbnail image to a current frame among the individual frames constituting the moving-image content that is displayed on the content reproduction screen when a switching operation for switching to the content selection screen is received.

Example of Relationship Between Thumbnail Image and Moving-Image Content

Figure 24A:
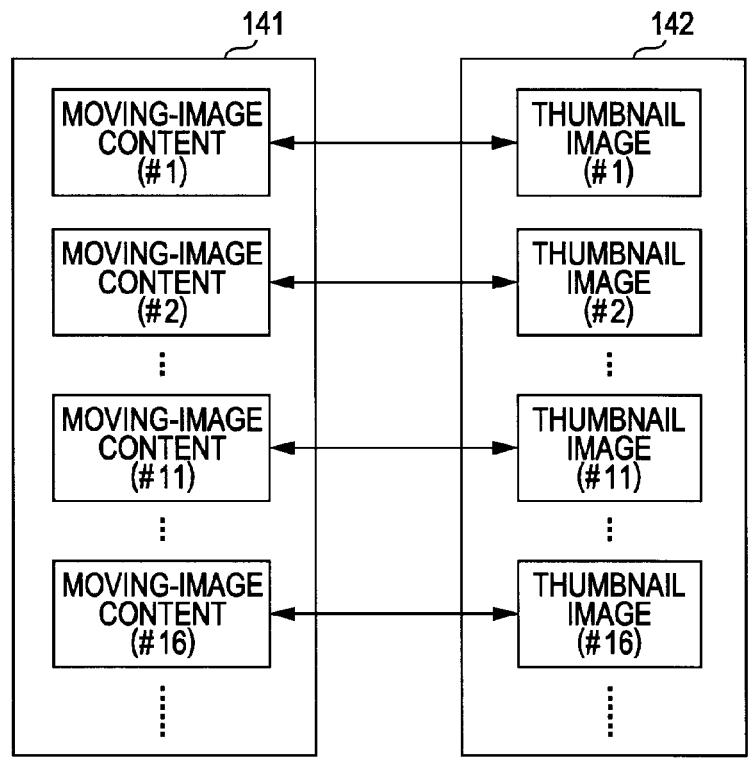
FIGS. 24A and 24B are diagrams schematically illustrating the relationship between moving-image content stored in a content storage unit and thumbnail images stored in a content management information storage unit according to a second embodiment of the present invention.
Figure 24B:
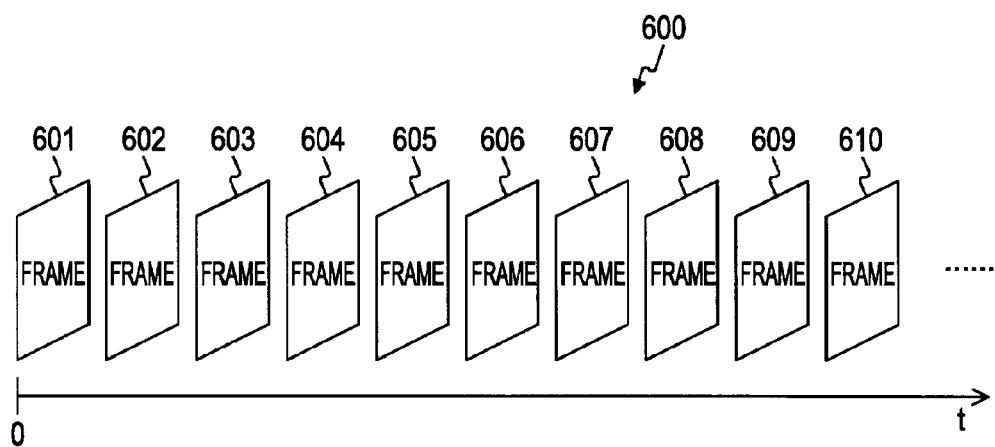

FIGS. 24A and 24B are diagrams schematically illustrating the relationship between moving-image content stored in the content storage unit 141 and thumbnail images stored in the content management information storage unit 142 according to the second embodiment of the present invention. In the second embodiment of the present invention, a description will be given using moving-image content as the content stored in the content storage unit 141.

FIG. 24A schematically illustrates the relationship between the content stored in the content storage unit 141 (pieces of moving-image content (#1 to #16)) and the thumbnail images (#1 to #16) stored in the content management information storage unit 142. FIG. 24A illustrates the correspondence between the content stored in the content storage unit 141 and the thumbnail images stored in the content management information storage unit 142 connected by arrows.

FIG. 24B schematically illustrates individual frames constituting the moving-image content (#11) stored in the content storage unit 141 in time series. Here, a frame 601 is the first frame among the individual frames constituting the moving-image content (#11), and frames 602 to 610 are sequential frames following the frame 601. In the first embodiment of the present invention, a description has been given about display examples in a case where still-image content is used as content and where a subject included in a thumbnail image is substantially the same as a subject included in still-image content. However, in a case where moving-image content is used as content, the content is composed of a plurality of frames as illustrated in FIG. 24B, and thus it is assumed that a subject included in a thumbnail image is significantly different from a subject included in still-image content. A specific example of those subjects is illustrated in FIG. 25.

Figure 25:
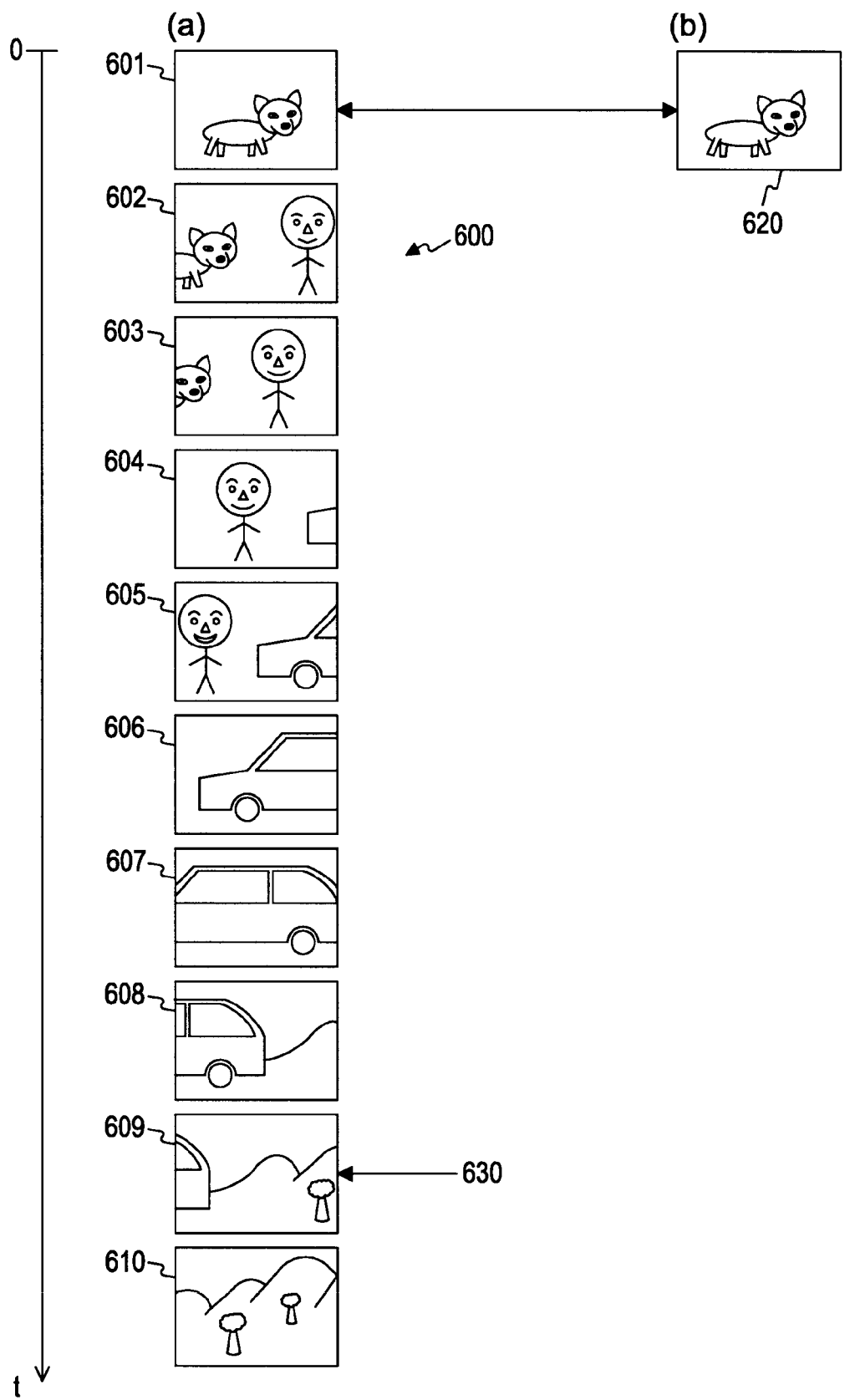
FIG. 25 is a diagram schematically illustrating an example of moving-image content stored in the content storage unit and a thumbnail image stored in the content management information storage unit according to the second embodiment of the present invention.

FIG. 25 is a diagram schematically illustrating an example of the moving-image content stored in the content storage unit 141 and the thumbnail image stored in the content management information storage unit 142 according to the second embodiment of the present invention. Part (a) of FIG. 25 illustrates the frames 601 to 610 constituting the moving-image content (#11) illustrated in part (b) of FIG. 24 in time series. Also, part (b) of FIG. 25 illustrates a thumbnail image (#11) 620 that is stored in the content management information storage unit 142 while being associated with the moving-image content (#11). For easy explanation, only simplified images are shown in the rectangles corresponding to the frames 601 to 610 and the thumbnail image (#11) 620 illustrated in FIG. 25, and changes of subjects in the sequential frames are emphasized.

Here, for example, assume that the frames 601 to 609 constituting the moving-image content (#11) have been reproduced by a user operation. For example, assume that an instruction operation for stopping reproduction is performed at the position of the frame 609 after an instruction operation for reproducing the moving-image content (#11) is performed by a user operation. In such a case where an instruction operation for stopping reproduction is performed while moving-image content is being reproduced, the position of the frame at which the instruction operation for stopping reproduction is performed is recorded as resume information in the content management information stored in the content management information storage unit 142. In the example illustrated in part (a) of FIG. 25, the position of the frame 609 (a resume position 630) is recorded as resume information in the content management information of the moving-image content (#11) 600 in the content management information storage unit 142. In such a case where an instruction operation for providing an instruction to reproduce the moving-image content in which resume information is recorded in the content management information is performed, reproduction is started from the frame corresponding to the resume position. For example, in a case where an instruction operation for providing an instruction to reproduce the moving-image content (#11) 600 in which the resume position 630 is recorded in the content management information is performed, reproduction is started from the frame 609 corresponding to the resume position 630.

Here, in a case where the frame 609 is compared with the thumbnail image (#11) 620, the subjects included in both of them are completely different from each other, and it is assumed that recognizing the identity thereof is difficult. For example, assume a case where an animation process for sequentially scaling down the frame 609 to an arrangement position of the thumbnail image (#11) 620 is performed in a case where an instruction operation for stopping reproduction is performed while the frame 609 is displayed. In this case, the frame 609 that is displayed in the animation process is completely different from the thumbnail image (#11) 620 that is displayed just after the end of the animation process, and thus it is assumed that a user feels unnaturalness.

Also, for example, assume a case where an instruction to reproduce the moving-image content (#11) 600 is provided using a resume function. For example, assume a case where an instruction operation for providing an instruction to reproduce the moving-image content (#11) 600 is performed and where reproduction is started from the frame 609 corresponding to the resume position 630. For example, assume a case where an animation process for sequentially scaling up the thumbnail image (#11) 620 to the size of the entire content reproduction screen is performed. In this case, the thumbnail image (#11) 620 displayed through the animation process is completely different from the frame 609 displayed just after the end of the animation process, and thus it is assumed that a user feels unnaturalness. Therefore, in such a case, too, it is important to easily recognize the correspondence between both of them without causing the user to feel unnaturalness.

Accordingly, in the second embodiment of the present invention, a description will be given about an example of displaying an image to be scaled up or down by sequentially switching the image so that the relationship between a thumbnail image and an image to be scaled up or down can be easily recognized.

Example of Display Control on Content Selection Screen and Content Reproduction Screen FIG. 26 is a diagram illustrating transition of a display screen displayed on the display unit 181 according to the second embodiment of the present invention. Here, a description will be given about transition of the display screen in a case where reproduction of selected moving-image content is started from a resume position in a case where a selection operation is performed on a content selection screen 650. This example is the same as in the first embodiment of the present invention except that an image as a target of a scale-up process is sequentially changed. Thus, a description about a part common to that in the first embodiment of the present invention is omitted, and a description will be given mainly about a different point. Note that a thumbnail image 651 illustrated in part (a) of FIG. 26 is the same as the thumbnail image (#11) 620 illustrated in part (b) of FIG. 25. Also, among the thumbnail images displayed in the thumbnail image display area, the thumbnail images other than the thumbnail image 651 are simplified by attaching #1 to #10 and #12 to #16.

As illustrated in part (a) of FIG. 26, assume that a selection operation for selecting the thumbnail image 651 has been performed on the content selection screen 650, for example. In this case, the data obtaining unit 220 obtains the moving-image content (#11) 600 corresponding to the selected thumbnail image 651 from the content storage unit 141. Also, the data obtaining unit 220 obtains the content management information corresponding to the selected thumbnail image 651 from the content management information storage unit 142. Subsequently, the data obtaining unit 220 extracts individual frames from the first frame to the frame at a resume position on the basis of the resume information included in the obtained content management information and causes the image holding unit 230 to hold the extracted frames. For example, the frames 601 to 609 illustrated in part (a) of FIG. 25 are held in the image holding unit 230. In a case of extracting frames on the basis of resume information, all the frames from the first frame to the frame at the resume position may be extracted, or some of the frames may be extracted. For example, frames can be extracted at certain intervals.

Subsequently, the image processing unit 240 obtains the frames held in the image holding unit 230 in time series and draws the obtained frames while sequentially scaling up the frames in accordance with equations 1 to 4. The display control unit 250 causes the display unit 181 to sequentially display the images that have been drawn in this manner. For example, as illustrated in parts (b) to (e) of FIG. 26, images 652 to 655 obtained through sequential scaling-up according to equations 1 to 4 are displayed while being overlaid on the content selection screen 650. Note that the images 652 to 655 are images obtained through scaling-up performed on the frames 603, 605, 607, and 609 illustrated in part (a) of FIG. 25. Also, in this example, some of the frames 601 to 609 are displayed while being scaled up for easy explanation, but all the frames 601 to 609 may be displayed while being scaled up. Subsequently, when the size of the image that is scaled up in accordance with equations 1 to 4 becomes the same as the size of the content reproduction screen, as illustrated in part (e) of FIG. 26, the image scale-up process ends. Here, for example, the image that is displayed at the last of the scale-up process is preferably the frame corresponding to the resume position (e.g., the frame 609).

Figure 27:
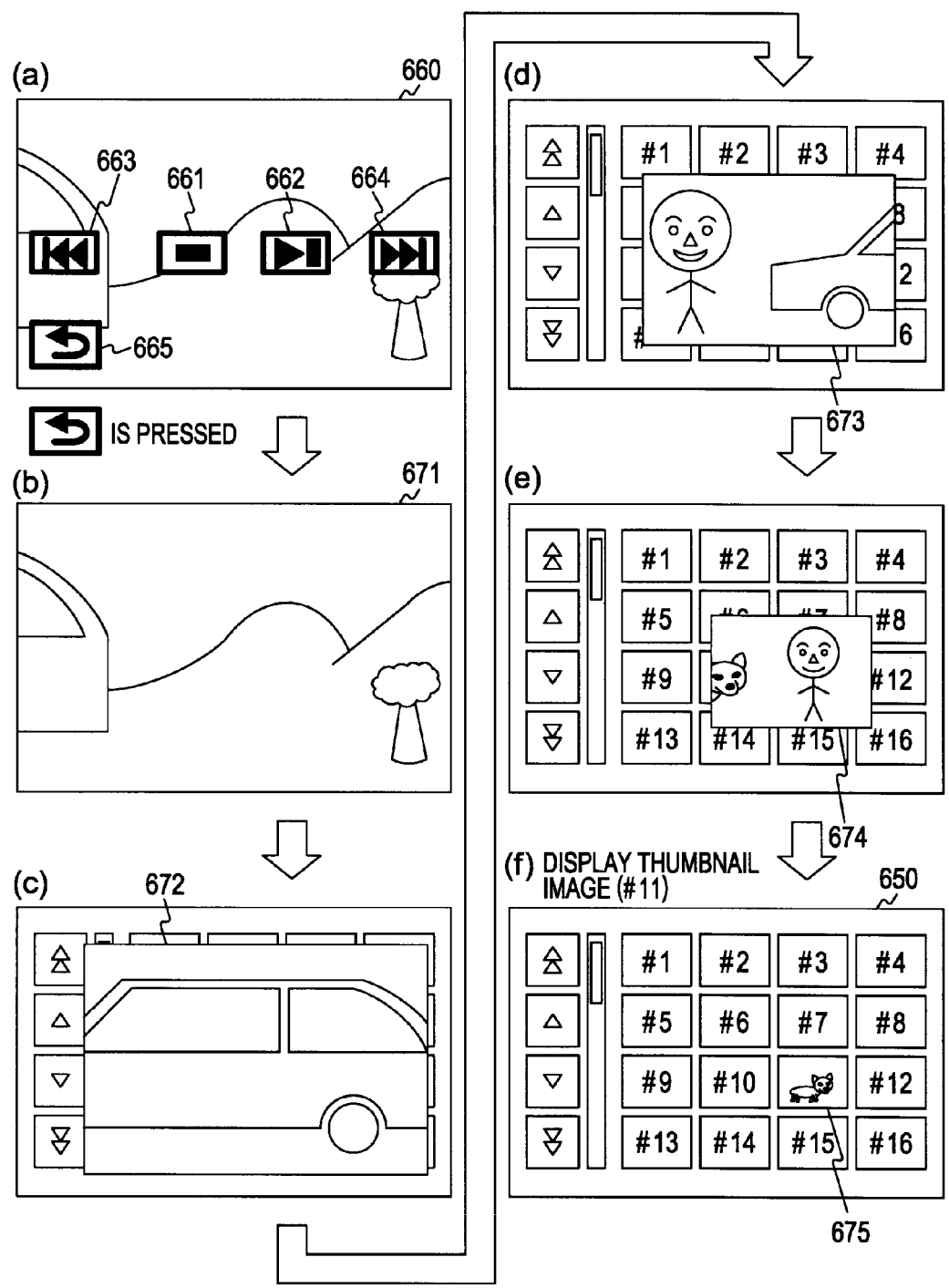
FIG. 27 is a diagram illustrating transition of a display screen displayed on the display unit according to the second embodiment of the present invention.

Part (f) of FIG. 26 illustrates a content reproduction screen 660 for displaying the moving-image content (#11) 600 corresponding to the thumbnail image 651. Here, individual frames constituting the moving-image content to be reproduced are sequentially displayed on the content reproduction screen 660, and operation buttons 661 to 665 are provided on the individual frames. The operation buttons 661 to 664 are buttons for performing a fast-forward operation, a fast-rewind operation, a stop operation, etc. of the moving-image content to be reproduced. The operation button 665 is a button that is pressed to end reproducing moving-image content and return to the content selection screen. FIG. 27 illustrates a display example in a case where the operation button 665 is pressed on the content reproduction screen 660.

FIG. 27 is a diagram illustrating transition of a display screen that is displayed on the display unit 181 according to the second embodiment of the present invention. In this example, transition of a display screen in a case where the operation button 665 is pressed on the content reproduction screen 660 is pressed is shown. This example is the same as in the first embodiment of the present invention except that the image as a target of a scale-down process is sequentially changed. Thus, a description about a part common to that in the first embodiment of the present invention is omitted, and a description will be given mainly about a different point. Note that a thumbnail image 675 illustrated in part (f) of FIG. 27 is the same as the thumbnail image (#11) 620 illustrated in part (b) of FIG. 25. Also, among the thumbnail images displayed in the thumbnail image display area, the thumbnail images other than the thumbnail image 675 are simplified by attaching #1 to #10 and #12 to #16.

As illustrated in part (a) of FIG. 27, assume that a press operation of the operation button 665 is performed on the content reproduction screen 660, for example. In this case, the data obtaining unit 220 extracts individual frames from the first frame to the frame that is displayed at the press operation for the moving-image content (#11) 600 that is displayed at the press operation, and causes the image holding unit 230 to hold the extracted frames. For example, the frames 601 to 609 illustrated in part (a) of FIG. 25 are held in the image holding unit 230. In such a case of extracting frames, all the frames from the first frame to the frame that is displayed at the press operation may be extracted, or some of the frames may be extracted. For example, frames can be extracted at certain intervals.

Subsequently, the image processing unit 240 obtains the frames held in the image holding unit 230 from a current frame toward the first frame, and draws the obtained frames while sequentially scaling down the frames in accordance with equations 5 to 8. The display control unit 250 causes the display unit 181 to sequentially display the images drawn in this manner. For example, as illustrated in parts (b) to (e) of FIG. 27, images 671 to 674 obtained through sequential scaling-down according to equations 5 to 8 are displayed while being overlaid on the content selection screen. Note that the images 671 to 674 are images obtained by scaling down the frames 609, 607, 605, and 603 illustrated in part (a) of FIG. 25. Also, in this example, some of the frames 601 to 609 are displayed while being scaled down for easy explanation, but all the frames 601 to 609 may be displayed while being scaled down. Subsequently, when the size of the image that is scaled down in accordance with equations 5 to 8 becomes the same as the size of a thumbnail image on the content selection screen, the image scale-down process ends. Here, for example, the image that is displayed at the last of the scale-down process is preferably the frame corresponding to the thumbnail image included in the content management information (e.g., the frame 601).

Part (f) of FIG. 27 illustrates the content selection screen 650 that is the same as the content selection screen 650 illustrated in part (a) of FIG. 26. As illustrated in part (f) of FIG. 27, after a scale-down process of the individual frames constituting the moving-image content (#11) 600 has ended, the display control unit 250 causes the thumbnail image 675 corresponding to the moving-image content (#11) 600 to be displayed.

In the examples illustrated in FIGS. 26 and 27, the content selection screen is displayed as a background of the image as a target of scaling-up or -down, but the background of the image as a target of scaling-up or -down may be solid black. Also, a thumbnail image corresponding to content in which resume information is recorded in content management information may be displayed with a mark (e.g., icon) indicating that resume information is recorded being superimposed on the thumbnail image.

Example of Relationship Between Thumbnail Image and Moving-Image Content

Figure 28:
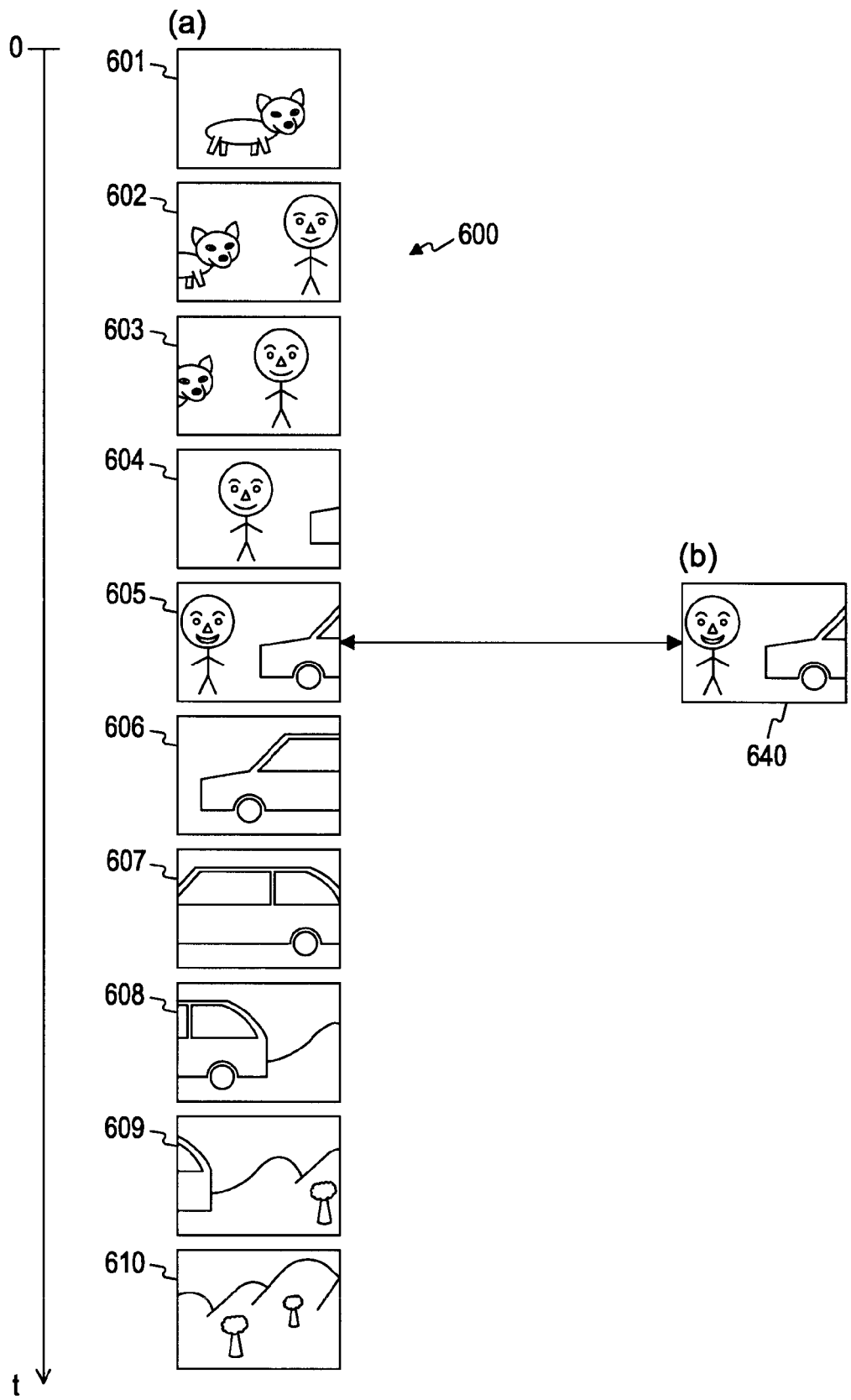
FIG. 28 is a diagram schematically illustrating an example of moving-image content stored in the content storage unit and a thumbnail image stored in the content management information storage unit according to the second embodiment of the present invention.

FIG. 28 is a diagram schematically illustrating an example of the relationship between the moving-image content stored in the content storage unit 141 and the thumbnail image stored in the content management information storage unit 142 according to the second embodiment of the present invention. This example shows a case where the thumbnail image included in the content management information that is stored while being associated with moving-image content is not the first frame. Note that the frames 601 to 610 illustrated in part (a) of FIG. 28 are the same as the frames 601 to 610 illustrated in part (a) of FIG. 25. For example, as illustrated in part (b) of FIG. 28, assume that a thumbnail image (#11) 640 included in the content management information that is stored while being associated with the moving-image content (#11) 600 is the image corresponding to the frame 605.

Figure 29:
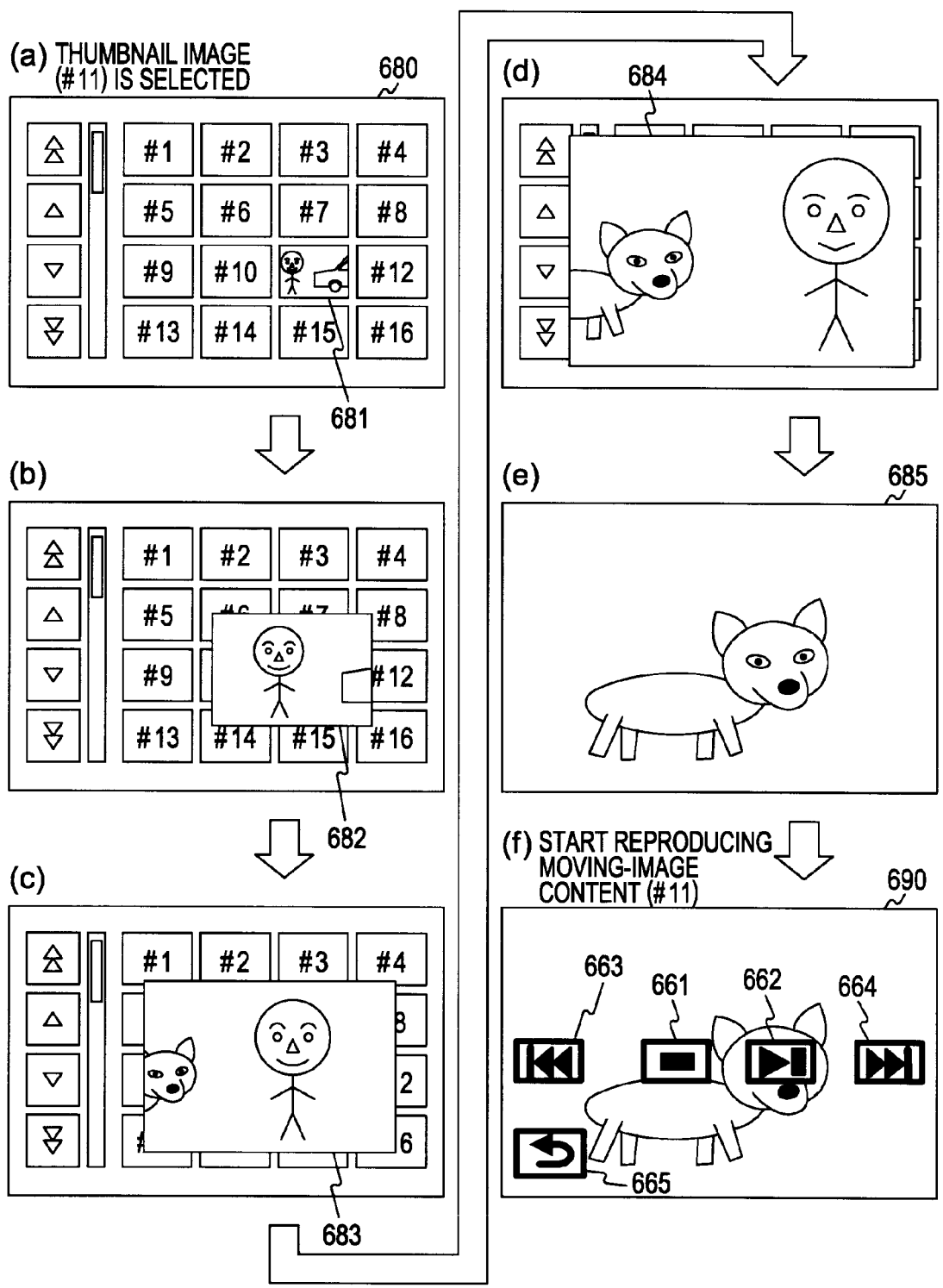
FIG. 29 is a diagram illustrating transition of a display screen displayed on the display unit according to the second embodiment of the present invention.

Example of Display Control on Content Selection Screen and Content Reproduction Screen FIG. 29 is a diagram illustrating transition of a display screen displayed on the display unit 181 according to the second embodiment of the present invention. This example shows transition of the display screen in a case where reproduction of selected moving-image content is started from the first frame when a selection operation is performed on the content selection screen 680. This example is substantially the same as the example illustrated in FIG. 26 except that the frame as a target of a scale-up process is different. Thus, a description about a part common to that in the example illustrated in FIG. 26 is omitted, and a description will be given mainly about a different point. Note that a thumbnail image 681 illustrated in part (a) of FIG. 29 is the same as the thumbnail image (#11) 640 illustrated in part (b) of FIG. 28.

As illustrated in part (a) of FIG. 29, for example, assume that a selection operation for selecting the thumbnail image 681 is performed on the content selection screen 680. In this case, the data obtaining unit 220 obtains the moving-image content (#11) 600 corresponding to the selected thumbnail image 681 from the content storage unit 141. Also, the data obtaining unit 220 obtains the content management information corresponding to the selected thumbnail image 681 from the content management information storage unit 142. Subsequently, the data obtaining unit 220 extracts individual frames from the frame corresponding to the thumbnail image to the first frame on the basis of the obtained content management information and causes the image holding unit 230 to hold the extracted frames. For example, the frames 601 to 605 illustrated in part (a) of FIG. 28 are held in the image holding unit 230. In such a case of extracting frames, all the frames from the frame corresponding to the thumbnail image to the first frame may be extracted, or some of the frames may be extracted. For example, frames can be extracted at certain intervals.

Subsequently, the image processing unit 240 obtains the frames held in the image holding unit 230 from the frame corresponding to the thumbnail image toward the first frame, and draws the obtained frames while sequentially scaling up the frames in accordance with equations 1 to 4. The display control unit 250 causes the display unit 181 to sequentially display the images drawn in this manner. For example, as illustrated in parts (b) to (e) of FIG. 29, images 682 to 685 obtained through sequential scaling-up according to equations 1 to 4 are displayed while being overlaid on the content selection screen 680. Note that the images 682 to 685 are images obtained by scaling up the frames 604 to 601 illustrated in part (a) of FIG. 28. Subsequently, as illustrated in part (e) of FIG. 29, when the size of the image that is scaled up in accordance with equations 1 to 4 becomes the same as the size of the content reproduction screen, the image scale-up process ends. Here, for example, the image that is displayed at the last of the scale-up process is preferably the first frame (e.g., the frame 601).

Part (f) of FIG. 29 illustrates a content reproduction screen 690 that displays the moving-image content (#11) 600 corresponding to the thumbnail image 681. Here, the individual frames constituting the moving-image content to be reproduced are sequentially displayed on the content reproduction screen 690, and the operation buttons 661 to 665 are provided on the individual frames.

In this way, for example, it is assumed that a frame other than the first frame constituting moving-image content is used as a thumbnail image that is displayed on the content selection screen. For example, a frame that is not the first frame may be used due to a selection made by a user or automatic extraction of a characteristic frame. Even in this case, the correspondence between the thumbnail image selected by the user and the moving-image content to be reproduced can be easily recognized.

Operation Example of Imaging Apparatus

Next, an operation of the imaging apparatus 100 according to the second embodiment of the present invention will be described with reference to the drawings. Note that the examples illustrated in FIGS. 30 to 32 are modifications of the examples illustrated in FIGS. 21 to 23. Thus, hereinafter, a description will be given about only a process procedure different from that in FIGS. 21 to 23, and a description about a common part is omitted.

FIG. 30 is a flowchart illustrating an animation process for reproducing content in a process procedure of a display control process performed by the imaging apparatus 100 according to the second embodiment of the present invention. This animation process for reproducing content is a modification of the process procedure of step S910 illustrated in FIGS. 21 and 22. In this modification, reproduction is started from a resume position.

First, the data obtaining unit 220 obtains moving-image content corresponding to a thumbnail image selected on the content selection screen. Then, the data obtaining unit 220 extracts individual frames from the first frame to the frame at a resume position among frames constituting the obtained moving-image content and causes the image holding unit 230 to hold the extracted frames (step S931).

Subsequently, the parameter "a" is initialized to 0 (step S932). Subsequently, the image processing unit 240 calculates the coordinates and size to be used for an image drawing process (step S933). Here, the coordinates and size are calculated using equations 1 to 4.

Subsequently, the image processing unit 240 obtains a frame as a target of a scale-up process from the image holding unit 230 and draws an image corresponding to the obtained frame on the basis of the calculated coordinates and size (step S934). Subsequently, the display control unit 250 causes the display unit 181 to display the drawn image (step S935). In this case, the background of the drawn thumbnail image is solid black.

Subsequently, it is determined whether the parameter "a" is 1 or more (step S936). In a case where the parameter "a" is not 1 or more (step S936), the parameter "a" is changed (step S937), and the frame as a target of a scale-up process is changed (step S938). Note that the frame as a target of a scale-up process is changed along the time axis. Also, the frame may be changed for every scale-up process or at certain intervals. In a case where the parameter "a" is 1 or more (step S936), the operation of the animation process for reproducing content ends.

FIG. 31 is a flowchart illustrating an animation process for ending reproducing content in the process procedure of the display control process performed by the imaging apparatus 100 according to the second embodiment of the present invention. This animation process for ending reproducing content is a modification of the process procedure of step S920 illustrated in FIGS. 21 and 23.

First, the data obtaining unit 220 extracts individual frames from the first frame to the frame at the end of reproduction among frames constituting the moving-image content for which an instruction to end is provided on the content reproduction screen, and causes the image holding unit 230 to hold the extracted frames (step S941).

Subsequently, the parameter "a" is initialized to 0 (step S942). Subsequently, the image processing unit 240 calculates the coordinates and size to be used for an image drawing process (step S943). Here, the coordinates and size are calculated using equations 5 to 8.

Subsequently, the image processing unit 240 obtains a target frame from the image holding unit 230 and draws the image corresponding to the obtained frame on the basis of the calculated coordinates and size (step S944). Subsequently, the display control unit 250 causes the display unit 181 to display the drawn image (step S945). In this case, the background of the drawn thumbnail image is solid black.

Subsequently, it is determined whether the parameter "a" is 1 or more (step S946). In a case where the parameter "a" is not 1 or more (step S946), the parameter "a" is changed (step S947), and the frame as a target of a scale-down process is changed (step S948). Note that the frame as a target of the scale-down process is changed from the frame at the end of reproduction toward the first frame. Also, the frame may be changed for every scale-down process or at certain intervals. In a case where the parameter "a" is 1 or more (step S946), the operation of the animation process for ending reproducing content ends.

FIG. 32 is a flowchart illustrating an animation process for reproducing content in the process procedure of the display control process performed by the imaging apparatus 100 according to the second embodiment of the present invention. This animation process for reproducing content is a modification of the process procedure of step S910 illustrated in FIGS. 21 and 22, and is an example where a thumbnail image is not an image corresponding to the first frame. Also, this animation process for reproducing content is a modification of the example illustrated in FIG. 30. The parts same as those in the process procedure illustrated in FIG. 30 are denoted by the same reference numerals and the corresponding description is omitted.

First, the data obtaining unit 220 obtains moving-image content corresponding to a thumbnail image selected on the content selection screen. Then, the data obtaining unit 220 extracts individual frames from the first frame to the frame corresponding to the thumbnail image among frames constituting the obtained moving-image content and causes the image holding unit 230 to hold the extracted frames (step S951).

In a case where the parameter "a" is not 1 or more (step S936), the parameter "a" is changed (step S937), and the frame as a target of a scale-up process is changed (step S952). The frame as a target of the scale-up process is changed from the frame corresponding to the thumbnail image toward the first image.

As described above, in the embodiments of the present invention, a display screen is not suddenly changed but a thumbnail image selected by a user is displayed while being scaled up by animation at the transition from a content selection screen to a content reproduction screen. Accordingly, the correspondence between the thumbnail image selected by the user and the reproduced image can be easily recognized. Particularly, in a case where a thumbnail image is selected using a touch panel, it can be easily determined whether an image intended by the user has been selected properly.

Also, at the transition from the content reproduction screen to the content selection screen, the display screen is not suddenly switched but a content image that is being reproduced is displayed while being scaled down by animation. Accordingly, the correspondence between the content image that is being reproduced and the thumbnail image corresponding thereto can be easily recognized. Particularly, even in a case of returning to the content selection screen from a state where content that is different from the content selected first by a user on the content selection screen is being reproduced due to rewind of content or continuous reproduction of content, the correspondence therebetween can be easily recognized.

As described above, according to the embodiments of the present invention, the correspondence position between an index image and content can be easily recognized in a graphical user interface (GUI) of display transition that is performed between a content selection screen and a content reproduction screen. Accordingly, the visibility for viewing content can be increased.

Also, the embodiments of the present invention can be applied to a case of reproducing content other than moving-image content and still-image content. For example, the embodiments of the present invention can be applied to a case of reproducing music content by selecting desired content by displaying images about content of audio data (e.g., jacket images of music) in list form. For example, a jacket image can be displayed while music content is being reproduced, and the jacket image of music can be scaled up or down at selection of the content or at stopping of the content. Also, the embodiments of the present invention can be applied to item buttons or the like displayed in list form on a menu screen. For example, when an item button for displaying a menu screen in a lower layer is selected on a menu screen in an upper layer, the menu screen in the lower layer can be displayed while being scaled up by animation.

Also, the embodiments of the present invention can be applied to electronic apparatuses capable of reproducing content, such as mobile phones and portable media players. Also, the embodiments of the present invention can be applied to electronic apparatuses capable of outputting content and content management information about the content to a display device and causing the display device to display the content.

The above-described embodiments of the present invention are examples for realizing the present invention and have correspondence with specific features in the claims, as described above. However, the present invention is not limited to the embodiments and various modifications can be implemented without deviating from the scope of the present invention.

The process procedures described in the embodiments of the present invention may be regarded as a method including the series of procedures, as a program that causes a computer to execute the series of procedures, or as a recording medium that stores the program. Example of the recording medium include a compact disc (CD), a MiniDisc (MD), a digital versatile disc (DVD), a memory card, a Blu-ray Disc (registered trademark), and the like.

The present application contains subject matter related to that disclosed in Japanese Priority Patent Application JP 2009-082274 filed in the Japan Patent Office on Mar. 30, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
   an operation receiving unit configured to receive a switching operation for a display unit from a reproduction screen configured to display content to an index-image-list display screen configured to display in list form index images for allowing selection of the content;
   an image processing unit configured to sequentially scale down, from a size of the content on the reproduction screen to a certain size, an image related to content that is displayed on the reproduction screen when the switching operation is received; and
   a control unit configured to cause the display unit to display the image that is being sequentially scaled down, with an arrangement position of an index image corresponding to the content that is displayed on the reproduction screen when the switching operation is received serving as a reference position, and cause the display unit to display the index image at the arrangement position of the display unit when a size of the image that is being sequentially scaled down reaches the certain size, wherein
   the content is moving-image content,
   the index image is an image corresponding to a representative frame among individual frames constituting the moving-image content, and
   the image processing unit sequentially scales down individual frames from the representative frame to a current frame that is displayed on the reproduction screen when the switching operation is received among individual frames constituting moving-image content that is displayed on the reproduction screen when the switching operation is received from the current frame toward the representative frame.

2. The electronic apparatus according to claim 1, wherein the image processing unit sequentially scales down the image related to the content that is displayed on the reproduction screen when the switching operation is received while decreasing a scale-down rate per unit time of the image.

3. A display control method comprising:
   receiving a switching operation for a display unit from a reproduction screen configured to display content to an index-image-list display screen configured to display in list form index images for allowing selection of the content;
   sequentially scaling down, from a size of the content on the reproduction screen to a certain size, an image related to content that is displayed on the reproduction screen when the switching operation is received; and
   causing the display unit to display the image that is being sequentially scaled down, with an arrangement position of an index image corresponding to the content that is displayed on the reproduction screen when the switching operation is received serving as a reference position, and causing the display unit to display the index image at the arrangement position of the display unit when a size of the image that is being sequentially scaled down reaches the certain size, wherein
   the content is moving-image content,
   the index image is an image corresponding to a representative frame among individual frames constituting the moving-image content, and
   the sequentially scaling down includes sequentially scaling down individual frames from the representative frame to a current frame that is displayed on the reproduction screen when the switching operation is received among individual frames constituting moving-image content that is displayed on the reproduction screen when the switching operation is received from the current frame toward the representative frame.

4. A non-transitory computer-readable medium including a program that causes a computer to execute:
   receiving a switching operation for a display unit from a reproduction screen configured to display content to an index-image-list display screen configured to display in list form index images for allowing selection of the content;
   sequentially scaling down, from a size of the content on the reproduction screen to a certain size, an image related to content that is displayed on the reproduction screen when the switching operation is received; and
   causing the display unit to display the image that is being sequentially scaled down, with an arrangement position of an index image corresponding to the content that is displayed on the reproduction screen when the switching operation is received serving as a reference position, and causing the display unit to display the index image at the arrangement position of the display unit when a size of the image that is being sequentially scaled down reaches the certain size, wherein
   the content is moving-image content,
   the index image is an image corresponding to a representative frame among individual frames constituting the moving-image content, and
   the sequentially scaling down includes sequentially scaling down individual frames from the representative frame to a current frame that is displayed on the reproduction screen when the switching operation is received among individual frames constituting moving-image content that is displayed on the reproduction screen when the switching operation is received from the current frame toward the representative frame.

* * * * *